(12) United States Patent
Hara

(10) Patent No.: US 8,176,008 B2
(45) Date of Patent: *May 8, 2012

(54) APPARATUS AND METHOD FOR REPLICATING DATA IN FILE SYSTEM

(75) Inventor: Junichi Hara, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,769

(22) Filed: Nov. 18, 2010

(65) Prior Publication Data

US 2011/0066596 A1 Mar. 17, 2011

Related U.S. Application Data

(63) Continuation of application No. 11/325,015, filed on Jan. 3, 2006, now Pat. No. 7,865,462.

(51) Int. Cl.
*G06F 17/00* (2006.01)
*G06F 13/00* (2006.01)
*G06F 11/00* (2006.01)

(52) U.S. Cl. ............................ 707/610; 711/162; 714/3

(58) Field of Classification Search ......................... None
See application file for complete search history.

(56) References Cited

U.S. PATENT DOCUMENTS

| 7,526,668 | B2 | 4/2009 | Shitomi et al. |
| 7,720,796 | B2 * | 5/2010 | Wong et al. .................. 707/639 |
| 2005/0108187 | A1 | 5/2005 | Fujibayashi |
| 2006/0080362 | A1 * | 4/2006 | Wagner et al. ................ 707/200 |

OTHER PUBLICATIONS

United States Office Action dated Mar. 1, 2010, Issued in Corresponding U.S. Appl. No. 11/325,015.
Shepler, S., et al., "Network File System (NFS) version 4 Protocol," The Internet Society, Apr. 2003.
Noveck, D., et al., "Implementation Guide for Referrals in NFSv4," The Internet Society, Jul. 2005.
Pawlowski, B., et al "The NFS Version 4 Protocol," Network Appliance, 2005.

* cited by examiner

*Primary Examiner* — Tarek Chbouki
(74) *Attorney, Agent, or Firm* — Sughrue Mion, PLLC

(57) ABSTRACT

A data replication system comprises a NAS controller and a storage system. In a first embodiment, after a NAS system takes a snapshot of a volume, the NAS system changes the referral information within the volume. Also, as an additional way to ensure the consistency after taking a snapshot, the NAS System returns the changed referral information based on a referral management table when clients access a referral within the snapshot volume so that clients can access an appropriate volume. In a second embodiment, after a volume on a NAS system is replicated by remote copy to a remotely deployed NAS system, the remotely deployed NAS system returns the changed referral information based on a referral management table when clients access a referral within the replicated volume so that clients can access an appropriate volume.

8 Claims, 29 Drawing Sheets

| 1601 | 1602 | 1603 | 1604 |
|---|---|---|---|
| SUBJECT REFERRAL FILE | NEW TARGET | NEW PATH | |
| /snap1/usr/src | nas2 | /snap2 | |
| : | : | : | |

Figure 3

| | 1101 | 1102 | 1103 | 1104 |
|---|---|---|---|---|
| | PATH IN GLOBAL NAME SPACE | TARGET | PATH | |
| 1105 | / | nas1 | /export1 | |
| 1106 | /usr/src | nas2 | /export2 | |
| | : | : | : | |

Figure 4

| 2901 | OWN HOSTNAME 2902 | LOCAL EXPORTED DIRECTORY 2903 | LOCAL LOCATION OF REFERRAL FILE 2904 | TARGET 2905 | PATH 2906 |
|---|---|---|---|---|---|
| 2907 | nas1 | /export1 | /export1/usr/src | nas2 | /export2 |
| 2908 | nas2 | /export2 | NULL | NULL | NULL |

Figure 15

| | 1401 | 1402 | 1403 | 1404 | 1405 |
|---|---|---|---|---|---|
| | | PATH IN GLOBAL NAME SPACE | TARGET | PATH | SNAPSHOT PATH |
| 1406 | | / | nas1 | /export1 | /snap1 |
| 1407 | | /usr/src | nas2 | /export2 | /snap2 |
| | | : | : | : | : |

Figure 18

| | 3001 | 3002 | 3003 | 3004 | 3005 | 3006 |
|---|---|---|---|---|---|---|
| | | SUBJECT VOLUME | SNAPSHOT MOUNT POINT | SUBJECT REFERRAL FILE | NEW TARGET | NEW PATH |
| 3007 | | /export1 | /snap1 | /snap1/usr/src | nas2 | /snap2 |
| 3008 | | /export2 | /snap2 | NULL | NULL | NULL |

Figure 19

| 2301 | 2302 | 2303 | 2304 |
|---|---|---|---|
| SUBJECT REFERRAL FILE | | NEW TARGET | NEW PATH |
| /copy1/usr/src | | nas4 | /copy2 |
| ⋮ | | ⋮ | ⋮ |

Figure 25

| 2101 | 2102 | 2103 | 2104 | 2105 | 2106 |
|---|---|---|---|---|---|
| PATH IN GLOBAL NAME SPACE | | TARGET | PATH | REMOTE COPY TARGET | REMOTE COPY PATH |
| / | | nas1 | /export1 | nas3 | /copy1 |
| /usr/src | | nas2 | /export2 | nas4 | /copy2 |
| ⋮ | | ⋮ | ⋮ | ⋮ | ⋮ |

Figure 26

| SUBJECT REFERRAL FILE | NEW TARGET | NEW PATH |
|---|---|---|
| /copy1/usr/src | nas4 | /copy2 |
| NULL | NULL | NULL |

APPARATUS AND METHOD FOR REPLICATING DATA IN FILE SYSTEM

CROSS REFERENCE TO RELATED APPLICATIONS

This application is a continuation of U.S. application Ser. No. 11/325,015, filed on Jan. 3, 2006, the entire disclosure of which is incorporated by reference herein.

FIELD OF THE INVENTION

The present invention generally relates to computer storage systems and, more specifically, to file servers or Network Attached Storage (NAS) systems having NFS version 4 functionality.

DESCRIPTION OF THE RELATED ART

Historically, to share files with multiple hosts, protocols such as NFS version 2 or 3 have been used. In NFS version 2 and 3, the name space (directory tree) of a file system is constructed within each server. Therefore, when a file system on a server is migrated to a new server, clients themselves must change their target to send requests to access the migrated file system to the new server.

In recent years, NFS version 4 has been proposed, and is being developed and implemented on several platforms. In NFS version 4, the name space of a file system can be constructed over multiple servers utilizing Referrals. Referrals are the attributes that inform clients a new location of a file system. When a file system on an old server is migrated to a new server, and when a client accesses the file system on an old server, the client is notified of the new location of the file system so that the client can redirect the access request to the new server. Therefore, clients can access the file system transparently (without being concerned about the new location of the file system) even after the file system is migrated to another server. The feature is called "Global Name Space", and the file system having this feature is called "Global File System".

On the other hand, data replication techniques such as snapshot or remote copy are being used in preparation for situations where the original data becomes corrupted. Snapshot is a technique to take a point-in-time copy of a volume or each file and directory within a file server or a network attached storage (NAS) system, and remote copy is a technique to keep a synchronized or asynchronous copy of a volume in a remotely deployed file server or a NAS system.

When a volume containing a referral and a volume containing a file system which the referral indicates are replicated by those techniques, the referral should be changed so that it indicates the volume containing the replicated file system. However, because the conventional replication techniques make exact image of the original volume, the referral in the volume containing replicated data still indicate the original volume. Therefore, clients which are accessing the volume containing conventionally replicated data will be wrongly redirected to the original volume by the referral in the volume.

SUMMARY OF THE INVENTION

The inventive methodology is directed to methods and systems that substantially obviate one or more of the above and other problems associated with conventional techniques for data replication.

One aspect of the inventive concept is a computerized system for replicating data. The inventive system includes a first storage system storing first data, the first data containing a first referral pointing to second data. The first storage system is operable to replicate the first data to produce third data. The inventive system additionally includes a second storage system storing the second data; the second storage system being operable to replicate the second data to produce fourth data. In accordance with the aspect of the invention, upon replication of the first data, a second referral in the in the third data is corrected to point to the forth data.

Another aspect of the inventive concept is a method and a computer programming product embodying computer instructions for performing a method for replicating first data and second data. In accordance with the inventive method, first data is replicated to produce third data; the first data containing a first referral pointing to second data. The second data is replicated to produce fourth data. In accordance with the aspect of the invention, a second referral in the third data is corrected to point to the forth data.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 3 shows an exemplary embodiment of a referral management table.

FIG. 4 shows an exemplary embodiment of a global name space management table.

FIG. 15 shows referral information NAS Systems returning to the Management Host.

FIG. 18 shows an exemplary embodiment of a global name space management table after snapshot preparation.

FIG. 19 shows information included in an exemplary embodiment of a TAKE SNAPSHOT request.

FIG. 25 shows an exemplary embodiment of a referral management table in remote site NAS System1.

FIG. 26 shows an exemplary embodiment of a global name space management table after remote copy preparation.

FIG. 28 shows information included in an exemplary embodiment of a SETUP REMOTE COPY request.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

One aspect of the inventive concept is a system and method for preserving consistency of global name space constructed over multiple file servers or NAS systems using NFS version 4 Referral after replication.

An embodiment of the inventive system described herein comprised a NAS controller and a storage system.

In the 1st embodiment, after a NAS system takes a snapshot of a volume, the NAS system changes the referral information within the volume. Also, as the another way to ensure the consistency after taking a snapshot, the NAS System returns the changed referral information based on a referral management table when clients access a referral within the snapshot volume so that clients can access an appropriate volume.

In the 2nd embodiment, after a volume on a NAS system is replicated by remote copy to a remotely deployed NAS system, the remotely deployed NAS system returns the changed referral information based on a referral management table when clients access a referral within the replicated volume so that clients can access an appropriate volume.

1st Embodiment

System Configuration

Figure 1:
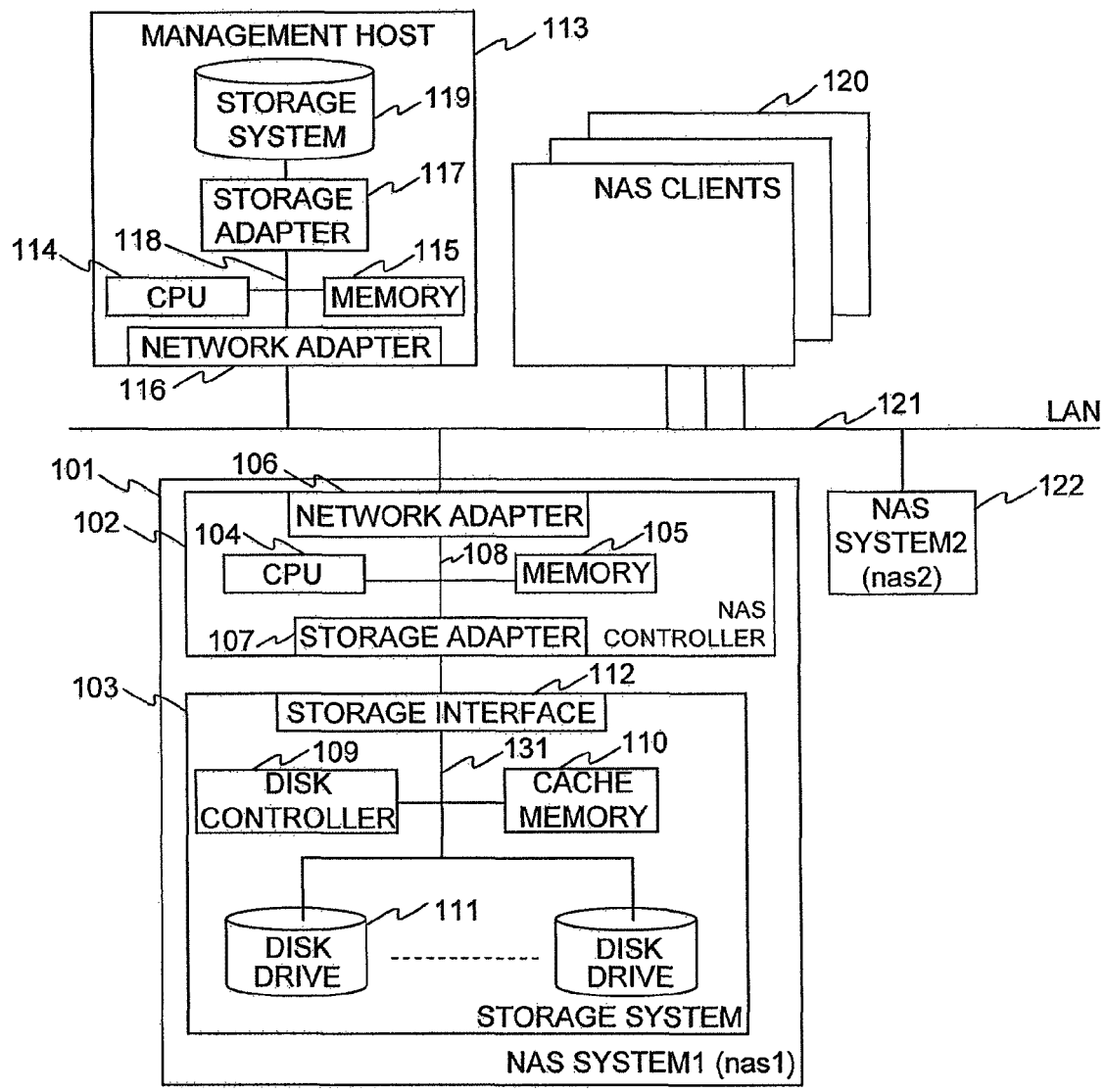
FIG. 1 shows an exemplary system configuration according to the first embodiment of the inventive concept.

FIG. 1 shows an example configuration of the system in which the methods and apparatus of the 1st embodiment are applied. The system is composed of a plurality of NAS Systems 101 and 122, a Management Host 113, and one or more NAS Clients 120.

Each of NAS System 101 and 122 comprises NAS Controller 102 and Storage System 103. NAS Controller 102 comprises CPU 104, Memory 105, Network Adapter 106, and Storage Adapter 107 interconnected via bus 108. These components are connected each other via Bus Storage System 103 comprises Disk Controller 109, Cache Memory 110, Disk Drives 111, and Storage Interface 112. These components are interconnected via Bus 131. NAS Controller 102 and Storage System 103 are connected each other via Storage Adapter 107 and Storage Interface 112. Here, interfaces such as Fibre Channel or SCSI can be used for Storage Interface 112. In such configurations, Host Bus Adapter (HBA) is used for Storage Adapter 107. Also, Storage System 103 can be externally deployed and connected to NAS Controller 102 via these interfaces. NAS System 101 is connected to Management Host 113, and NAS Clients 120 via Network Adapter 106. Some of the programs realizing this invention run on the NAS System 101 using CPU 104 in NAS Controller 102.

Management Host 113 comprises CPU 114, Memory 115, Network Adapter 116, Storage Adapter 117, and Storage System 119 interconnected via bus 118. Management Host 113 is connected to NAS Systems 101 and 102 via Network Adapter 116. Storage System 119 has the same components as Storage System 103, and can be externally deployed and connected. Some of the programs realizing this invention run on Management Host 113 using CPU 114.

Each of NAS Client 120 comprises the same components as Management Host 113.

NAS Systems 101 and 122, Management Host 113, and NAS Clients 120 are connected each other via LAN 121. NAS System1 101 has the hostname "nas1", and NAS System2 122 has the hostname "nas2" on the network.

Figure 2:
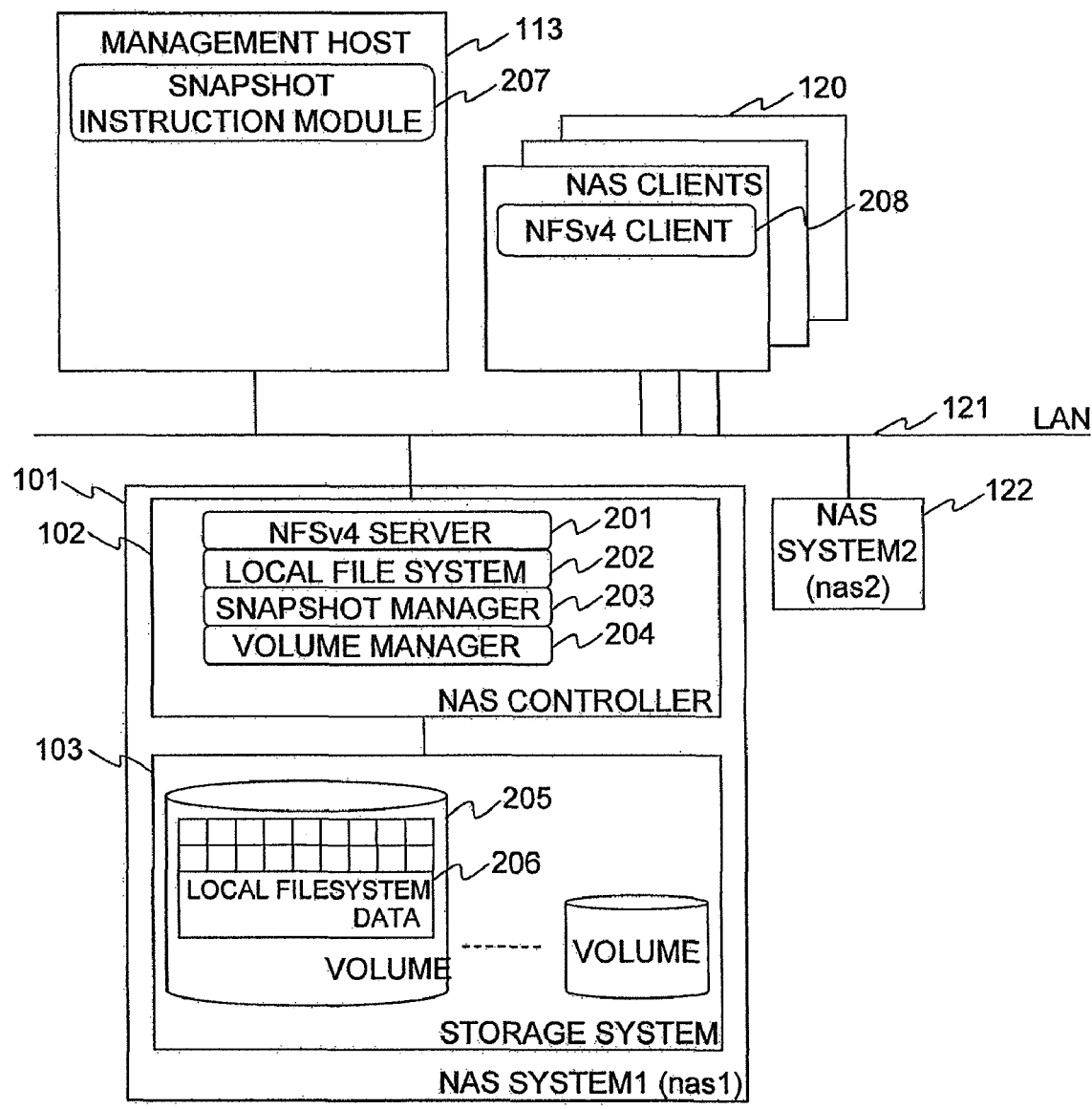
FIG. 2 shows an exemplary module configuration according to the first embodiment of the inventive concept.

Functional Diagram:

FIG. 2 shows a functional diagram of the system in 1st embodiment.

In the NAS Controller 102 in each of NAS System 101 and 102, there are NFSv4 Server 201, Local File System 202, Snapshot Manager 203, and Volume Manager 204. NAS Clients 120 execute NFSv4 Client 208.

NFSv4 Server 201 exports files (makes the files accessible) via NFS version 4 protocol in volumes that Local File System 202 mounts. Also, unlike usual NFS version 4 protocol, NFSv4 Server 201 returns changed referral information based on Referral Management Table 1601 when needed.

Local File System 202 receives file I/O requests from NFSv4 Server 201, and issues appropriate block I/O request to Volume Manager 204.

Snapshot Manager 203 instructs Volume Manager 204 to take a shapshot of a volume in accordance with an instruction from Management Host 113 or other NAS System. Also, Snapshot Manager 203 searches referrals in snapshot volumes in accordance with an instruction from Management Host 113, and returns the referral information to Management Host 113. Also, Snapshot Manager 203 searches referrals in snapshot volumes, and modifies the referrals when needed. Moreover, Snapshot Manager 203 manages Referral Management Table 1601 shown in FIG. 3 when needed. This table contains, for each referral in column 1602, new target information 1603, as well as new path information 1604.

Volume Manager 204 creates one or more Volumes 205, which include Local Filesystem Data 206, using one or more Disk Drives 111 in Storage System 103. Also, in accordance with an instruction from Snapshot Manager 203, Volume Manager 204 makes snapshot images of a specified volume using Volumes 205.

In the Management Host 113, there is Snapshot Instruction Module 207.

Snapshot Instruction Module 207 collects referral information from NAS Systems 101 and 102, and manages Global Name Space Management Table 1101 shown in FIG. 4. Also, Snapshot Instruction Module 207 instructs NAS Systems 101 and 102 to take a snapshot image of a volume.

Global File System and Global Name Space:

Global File System is a file system which is constructed over multiple file servers or NAS Systems. In the Global File System, the name space (the directory tree) of the file system extends across the multiple file servers or NAS Systems. The name space which extends multiple file servers or NAS Systems is called Global Name Space. By the feature of Global Name Space, clients can access the files and directories without being concerned about the physical location of file servers or NAS Systems even when the files and directories are migrated to another file server or NAS System.

In the NFS version 4 protocol, the feature is actualized by introducing Referrals. The detailed explanation is described later.

Local File System Data Structure:

Local File System is a file system with which each of the file servers or NAS systems manage files and directories within themselves. Each file server or NAS system can use a different file system.

Figure 5:
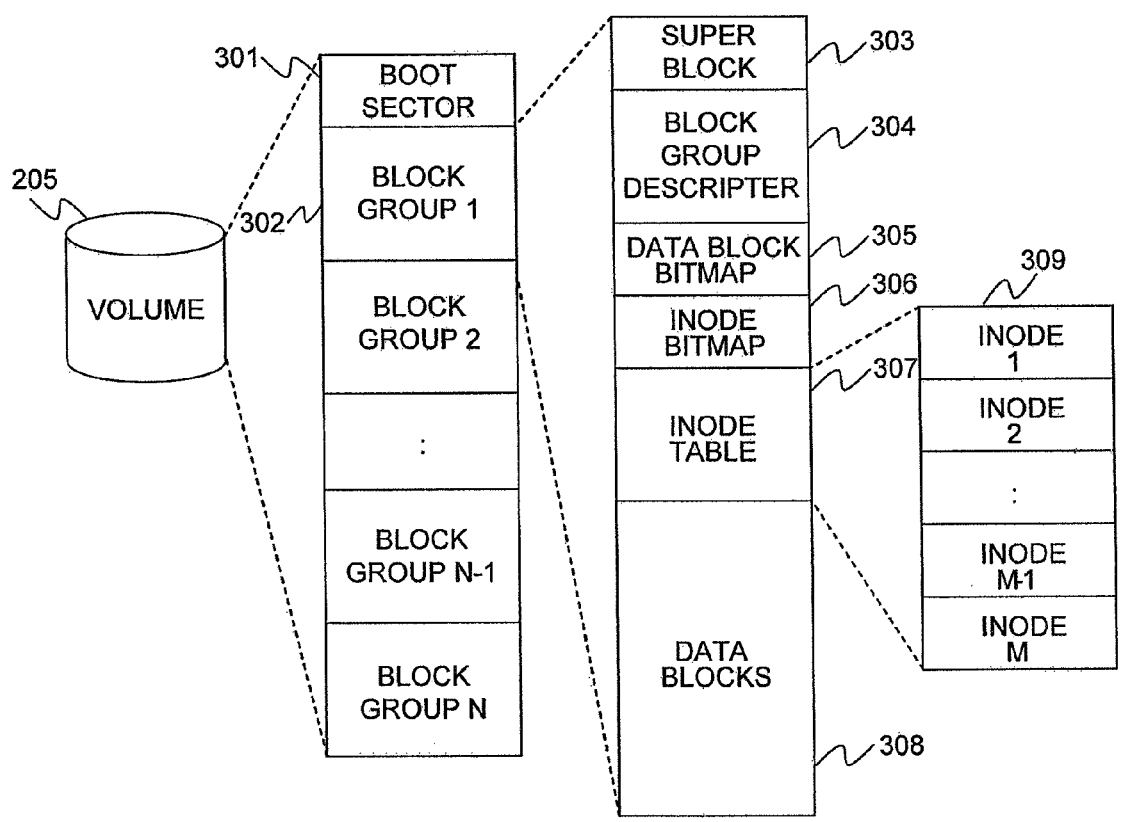
FIG. 5 illustrates an exemplary layout of file system data.

FIG. 5 shows how the data needed for Local File System 202 is stored in Volume 205. Boot Sector 301 is usually used to store programs to boot the System if needed. Local File System 202 doesn't change the data in Boot Sector 301. In this invention, Boot Sector 300 can be used to indicate if the volume contains replicated data or not. The rest of the volume is used by Local File System 202.

Local File System 202 divides the rest of the volume into Block Groups 302. Each Block Group 302 contains Super Block 303, Block Group Descriptor 304, Data Block Bitmap 305, Inode Bitmap 306, Inode Tables 307, and Data Blocks 308.

Super Block 303 is used to store the location information of Block Groups 302. Every Block Group 302 has the same copy of Super Block 303. Block Group Descriptor 304 stores the management information of the Block Group 302. Data Block Bitmap 305 shows which Data Blocks 308 are in use. In a similar manner, Inode Bitmap 306 shows which modes 309 in Inode Table 307 are in use.

Figure 6:
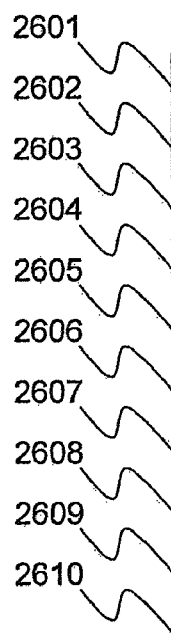
FIG. 6 shows exemplary inode information.
Figure 7:
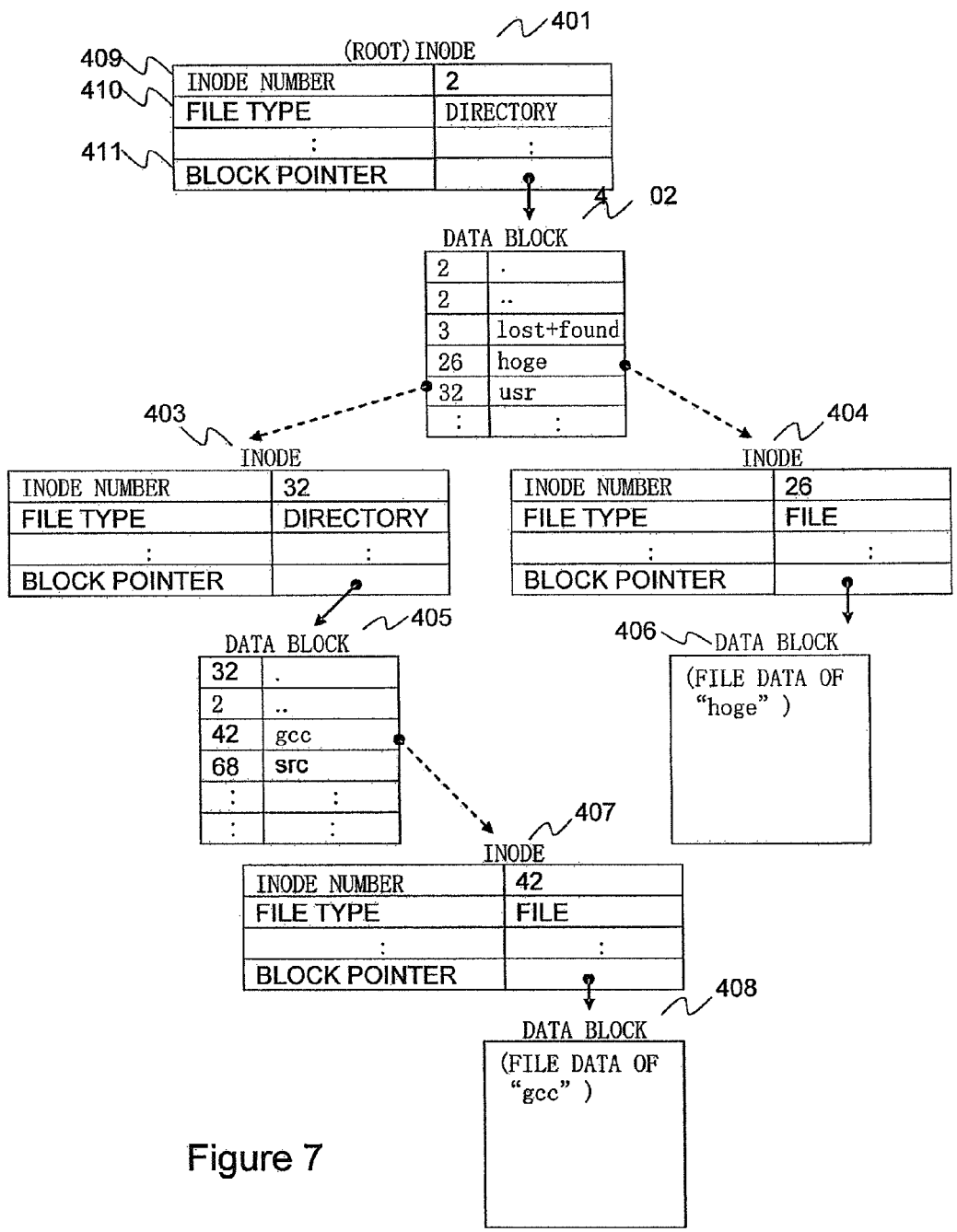
FIG. 7 shows an exemplary embodiment of a file system structure.

FIG. 6 shows what kind of data each Inode 309 in Inode Table 307 has. Each Inode 309 stores attributes of each file or directory such as:

Inode Number 2601: The unique number for the Inode
File Type 2602: What the Inode is used for (file, directory, etc)
File Size 2603: The size of the file
Access permission 2604: Bit string expressing access permissions for user (owner), group, other
User ID 2605: ID number of the user owning the file
Group ID 2606: ID number of the group that the user (owner) belongs to
Create Time 2607: The time when the file is created
Last Modify Time 2608: The time when the file is modified
Last Access Time 2609: The time when the file is last accessed
Block Pointer 2610: Pointer to the data blocks where actual data is stored FIG. 7 shows the logical relationship between Inodes 309 and Data Blocks 308. Each Inode 309 can be used to indicate a file or a directory. As shown in FIG. 7, Inode data structure includes Inode number 409. If the Inode indicates a file (if its File Type field 410 is "file", like in Inodes 404 and 407), the data blocks 406 and 408, respectively, pointed from these Inodes contain actual data of the corresponding files. If a file is stored in a plurality of Disk Blocks 308 (such as ten), the addresses of the ten Disk Blocks 308 are recorded in Block Pointer 2610. Each Block Pointer 411 is expressed as the logical block address (LBA) in Volume 205. If the Inode indicates a directory (if the File Type field is "directory", like in Inodes 401 and 403 of FIG. 7), the Data Blocks 308 (blocks 402 and 405 in FIG. 7), pointed from Block Pointer 2610 (element 411 in FIG. 7) store the list of Inode Numbers 2601 and Names of all files and directories in the corresponding directory.

Figure 8:
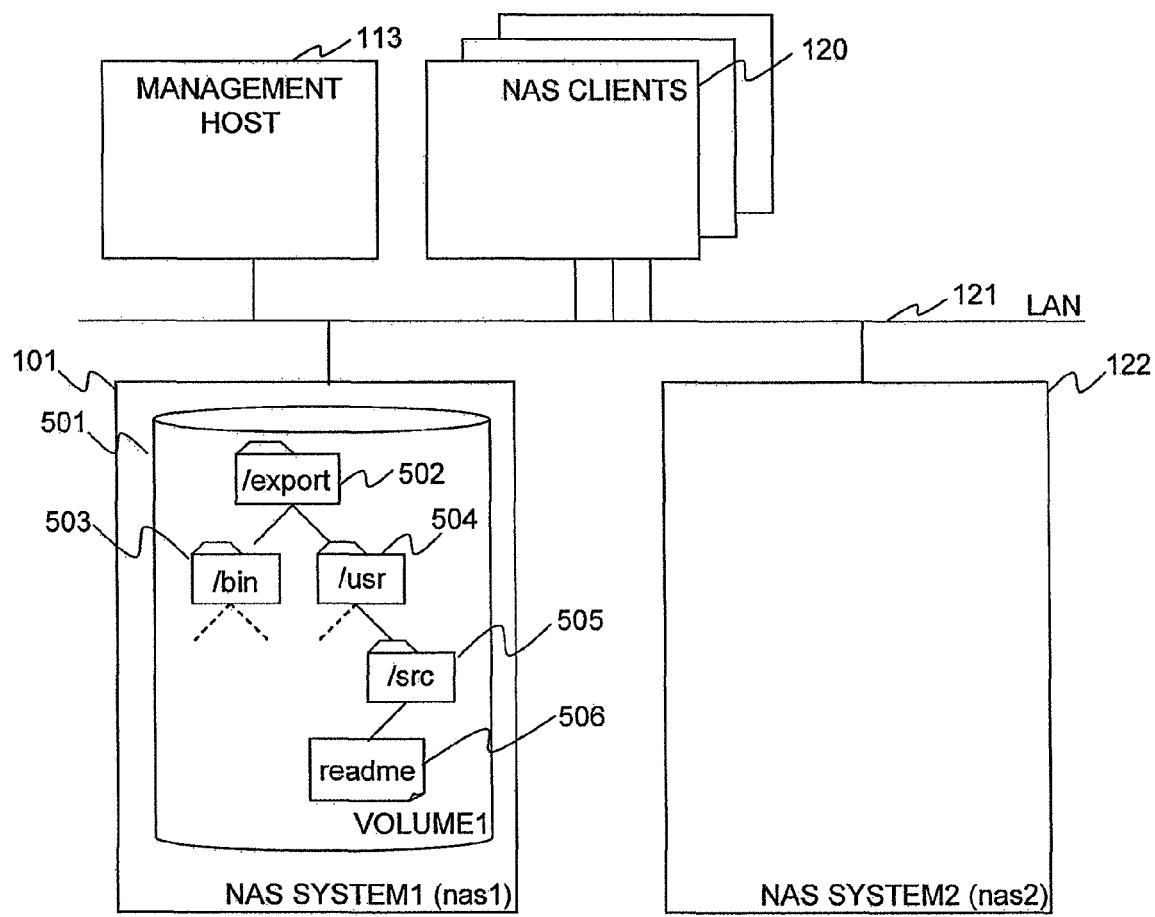
FIG. 8 illustrates exemplary file deployment.
Figure 9:
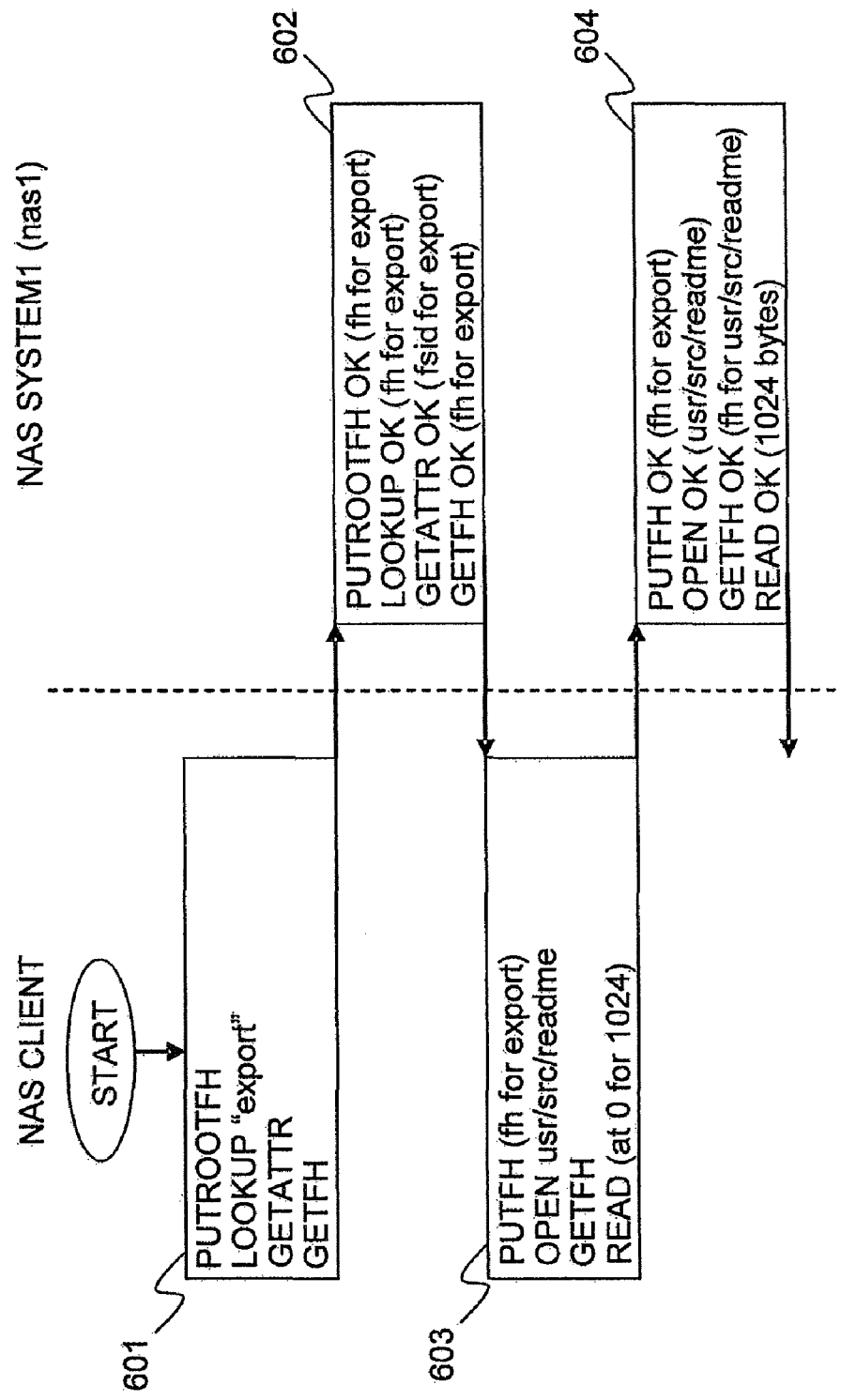
FIG. 9 illustrates reading of a file using NFSv4 protocol.

Accessing a File in a Volume using NFSv4:

Here, how the NAS Client 120 accesses a file in the NAS System1 101 is explained taking the situation shown in FIG. 8 as the example. In this example, since all the files 506 and directories 502-505 are located in one volume 501 and in one NAS System1 101, there are no referrals in the volume FIG. 9 shows the operations which NAS Clients 120 issues to NAS System1 101 to access the file "/export1/usr/src/readme". The NFS version 4 protocol has the clients refer to a file or directory at the server by a "filehandle" or "fh". Also, the NFS version 4 protocol has the feature called COMPOUND RPC procedure which allows the clients to group multiple file operations into a single request to send to the server. In NFS version 4, work is accomplished via operations. An operation is a file system action that forms part of a COMPOUND procedure. The server in turn groups the operations replies into a single response. On the server, evaluation proceeds until the first error or last operation whereupon the server returns a reply for all evaluated operations.

The first COMPOUND 601 issued by NAS Client 120 contains PUTROOTFH, LOOKUP, GETATTR, and GETFH operations. The contents in parentheses after each operation indicates arguments of the operation provided by the NAS Client 120, or value returned from the NAS System1 101.

The PUTROOTFH operation instructs the server to set the "current" filehandle to the ROOT of the server's file tree. The ROOT filehandle is one of the special filehandles in the NFS version 4 protocol. The ROOT filehandle is the "conceptual" root of the filesystem name space at the NFS server. The client uses or starts with the ROOT filehandle by employing the PUTROOTFH operation. Once this PUTROOTFH operation is used, the client can then traverse the entirety of the server's file tree with the LOOKUP operation.

The LOOKUP operation instructs the server to look up a specified file name or directory name on the server, and return the filehandle for the file or the directory.

The GETATTR operation will obtain attributes for the filesystem object specified by the current filehandle such as file type or file size.

The GETFH operation will obtain current filehandle.

In response to the first COMPOUND 601 issued by the NAS Client 120, the NAS System1 101 will return the filehandle for "/export1" to the client, see FIG. 9, 602.

The second COMPOUND 603 issued by NAS Client 120 contains PUTFH, OPEN, GETFH, and READ operations.

The PUTFH operation replaces the current filehandle with the filehandle provided as an argument of the operation (in this case, the filehandle for "/export1" is provided by the client).

The OPEN operation instructs the server to open the file with the filehandle provided as an argument of the operation (in this case, the filehandle for "/export1/usr/src/readme" is provided).

The READ operation instructs the server to read the file and return the data to the client.

In response to the second COMPOUND 603 issued by the NAS Client 120, the NAS System1 101 will return the data in "/export1/usr/src/readme", see FIG. 9, 604.

Figure 10:
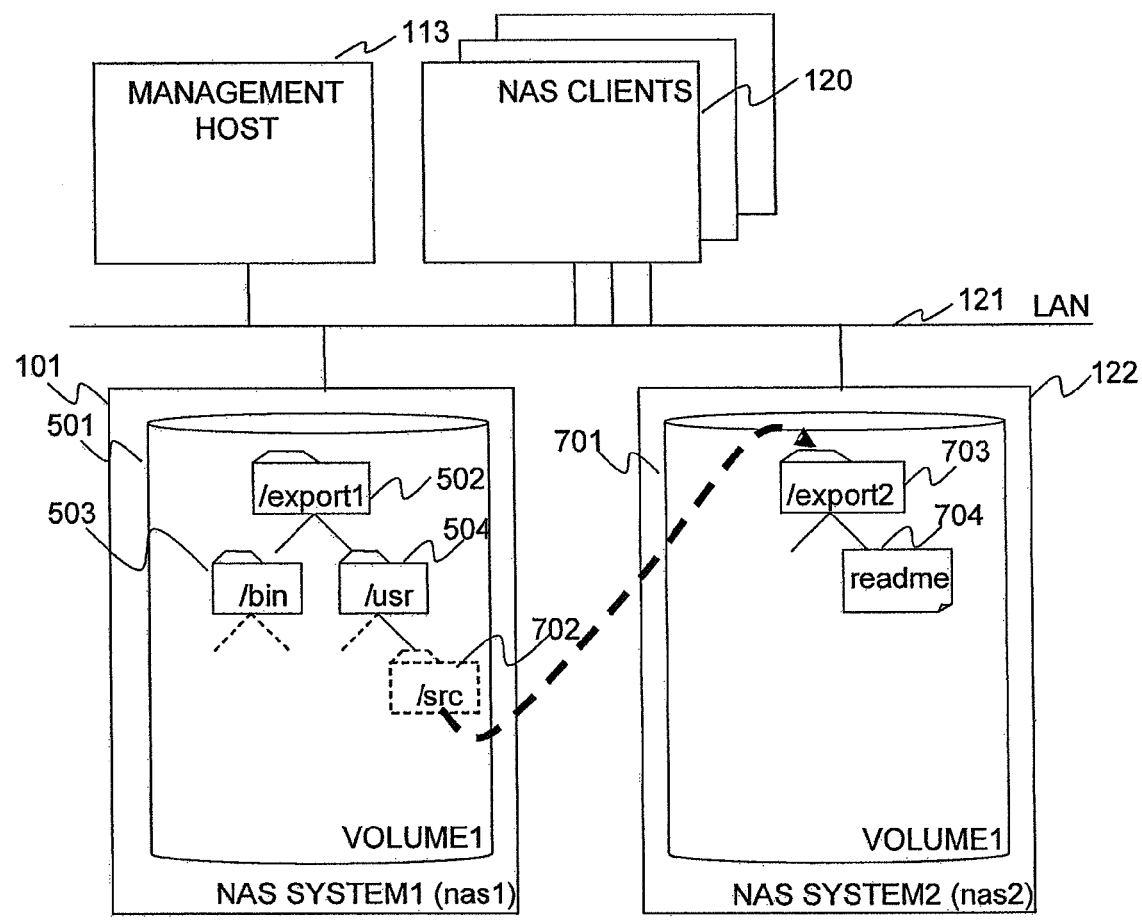
FIG. 10 shows exemplary file deployment after a part of a file system is migrated.

Accessing a File in a Volume with Referral using NFSv4:

Next, taking the situation shown in FIG. 10 as the example, how the NAS Client 120 accesses a file in the NAS System1 101 in case there is a referral in the file system is explained. In this example, the files and directories under "/export1/usr/src" on the NAS System1 101 have been migrated to "/export2" 703 on the NAS System2 122 (see, for example, file 704 in FIG. 10), and "/export1/usr/src" 702 now has been replaced with a referral 702. To express the referral information showing that the files and directories are migrated to "/export2" 703 on the NAS System2 122 (its hostname is "nas2"), we use the expression like "nas2:/export2".

Figure 11:
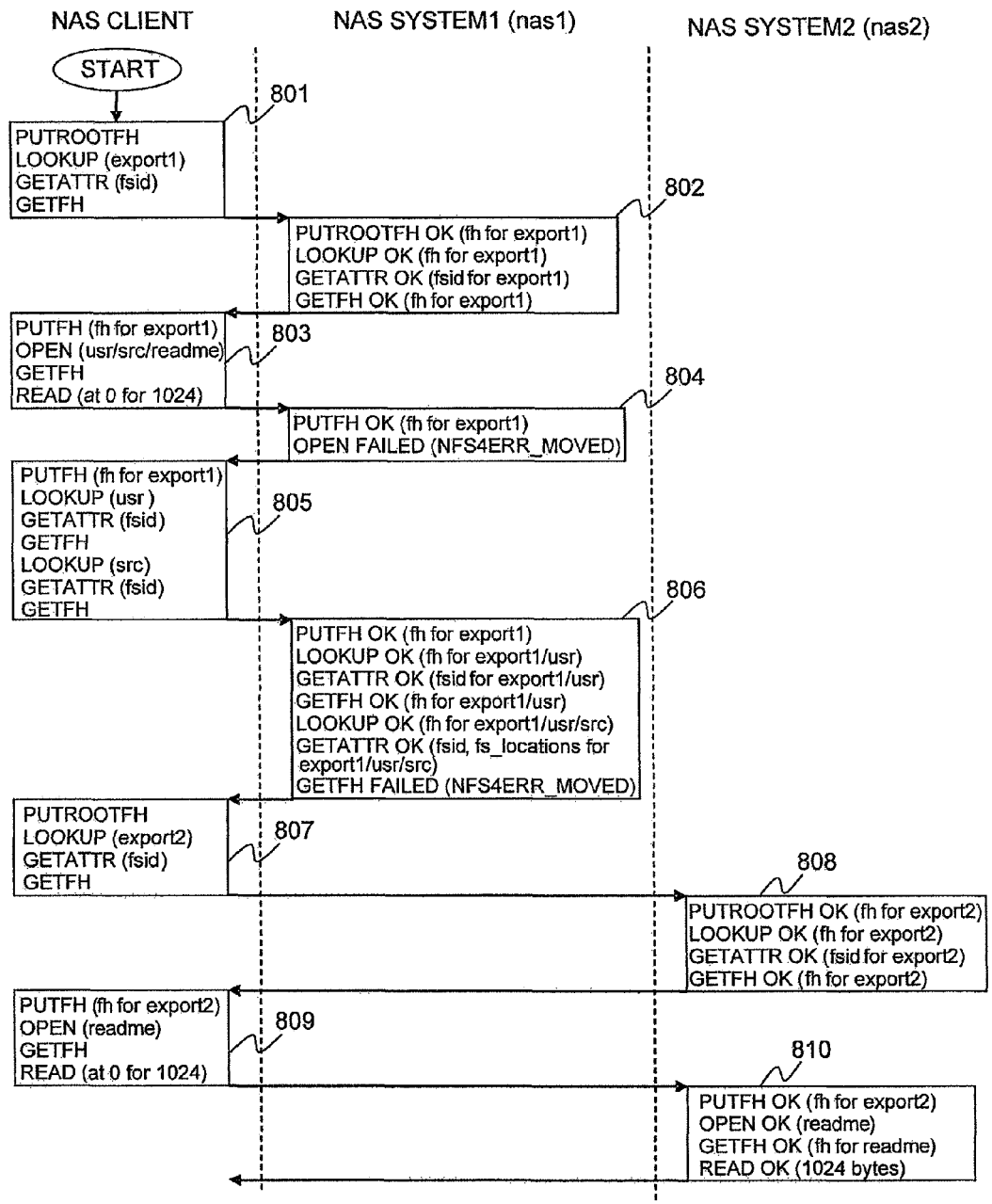
FIG. 11 illustrates reading of a file using NFSv4 protocol in case when a part of a file system is migrated.

FIG. 11 shows exemplary operation requests, which NAS Clients 120 may issue to NAS System1 101 in order to access the file "/export1/usr/src/readme", in case where "/export1/usr/src" on the NAS System1 101 has been migrated to "/export2" 703 on the NAS System2 122, and "/export1/usr/src" 702 has been replaced with a referral 702. The first COMPOUND 801 issued by the NAS Client 120 and response 802 from the NAS System1 to the COMPOUND 802 are the same as the ones 601 and 602 in the example shown in FIG. 9. In response to the COMPOUND 803, the NAS System1 101 will return with response 804 the error code "NFS4ERR_MOVED" because "/export1/usr/src" is no longer located in the NAS System1 101, and the OPEN operation for "/export1/usr/src/readme" will fail.

After receiving the error code "NFS4ERR_MOVED", the NAS Client 120 will issue another COMPOUND 805 to determine under which directory is migrated. In response 806 to the COMPOUND 805, the NAS System1 101 will return "NFS4ERR_MOVED" again. However, at the same time, in response to the GETATTR operation for "/export1/usr/src", the NAS System1 101 returns "fs_locations". The "fs_locations" is a structure containing the referral information. In this case, the "fs_locations" contains the referral information "nas2:/export2". In reference to this information, the NAS Client 120 can determine to which location it has to redirect the operations. In this case, the NAS Client 120 can determine the desired file is located in "nas2:/export2". Therefore, the NAS Client 120 issues another COMPOUND 807 and 809 to access the file "/export2/readme" on the NAS System2 122. In response to COMPOUND 807 and 809, NAS System 2 122 issues responses 808 and 810.

Figure 12:
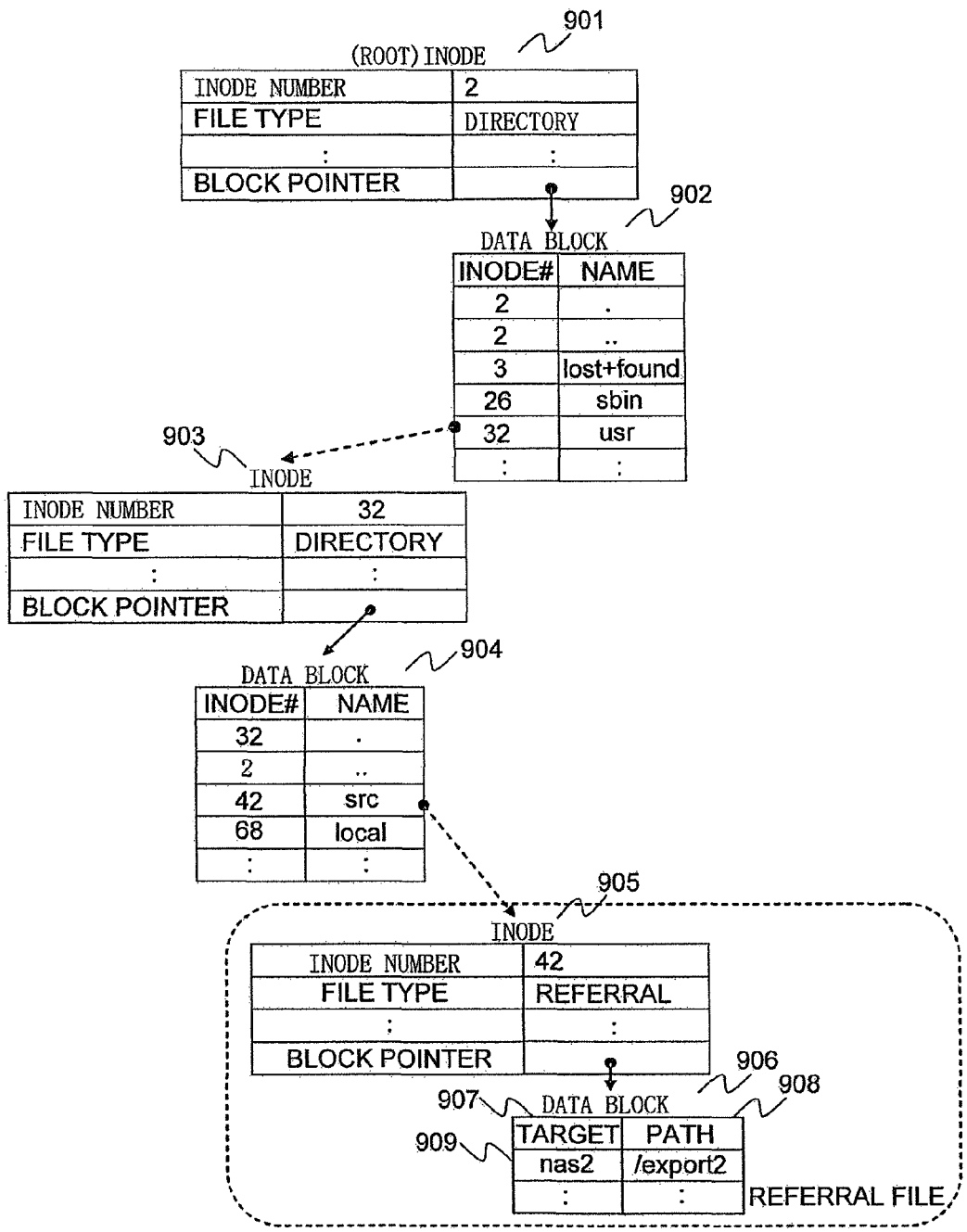
FIG. 12 shows an exemplary embodiment of a referral file.

Implementation Example of Referral:

FIG. 12 shows the example implementation of a referral. In this example, the referral is implemented as a referral file. Also, the example shows the case where the file system (or files and directories) under the directory "src" are migrated to NAS System2 122.

FIG. 12 shows root directory Inode 901, which points to a data block 902, containing its file and subdirectory information. The entry corresponding to subdirectory "usr" has an associated directory-type Inode 903, which points to data block 904, containing referral file "src".

In the Inode for referral file "src", the File Type field indicates "referral" as in item 905. The Data Blocks 906 pointed from Block Pointer 2610 in the Inode store the list of new locations which consists of Target 907 and Path 908. Target 907 indicates the hostname of the NAS System which the file system or files and directories under the directory "src" is migrated to, and Path 908 indicates the path to the directory in which the migrated data is stored within the NAS System. In this example, the row 909 indicates the files and directories under "src" is migrated to "nas2:/export2".

Snapshot:

Snapshot is a mechanism to take a point in time copy of a volume within a file server or a NAS system. There are various methods to implement snapshot mechanism. Mirroring is one of the most popular implementations.

In the mirroring method, a volume (a shadow volume) that has the same size as the original volume is prepared, and the shadow volume is associated with the original volume. Right after the shadow volume is associated with the original volume, all the data in the original volume is copied to the shadow volume (initial copy). After the initial copy is completed, all the write I/Os to the original volume are also applied to the shadow volume. When a data image in a certain time needs to be kept, applying write I/Os to the shadow volume is stopped (splitting the shadow volume from the original volume).

Figure 13:
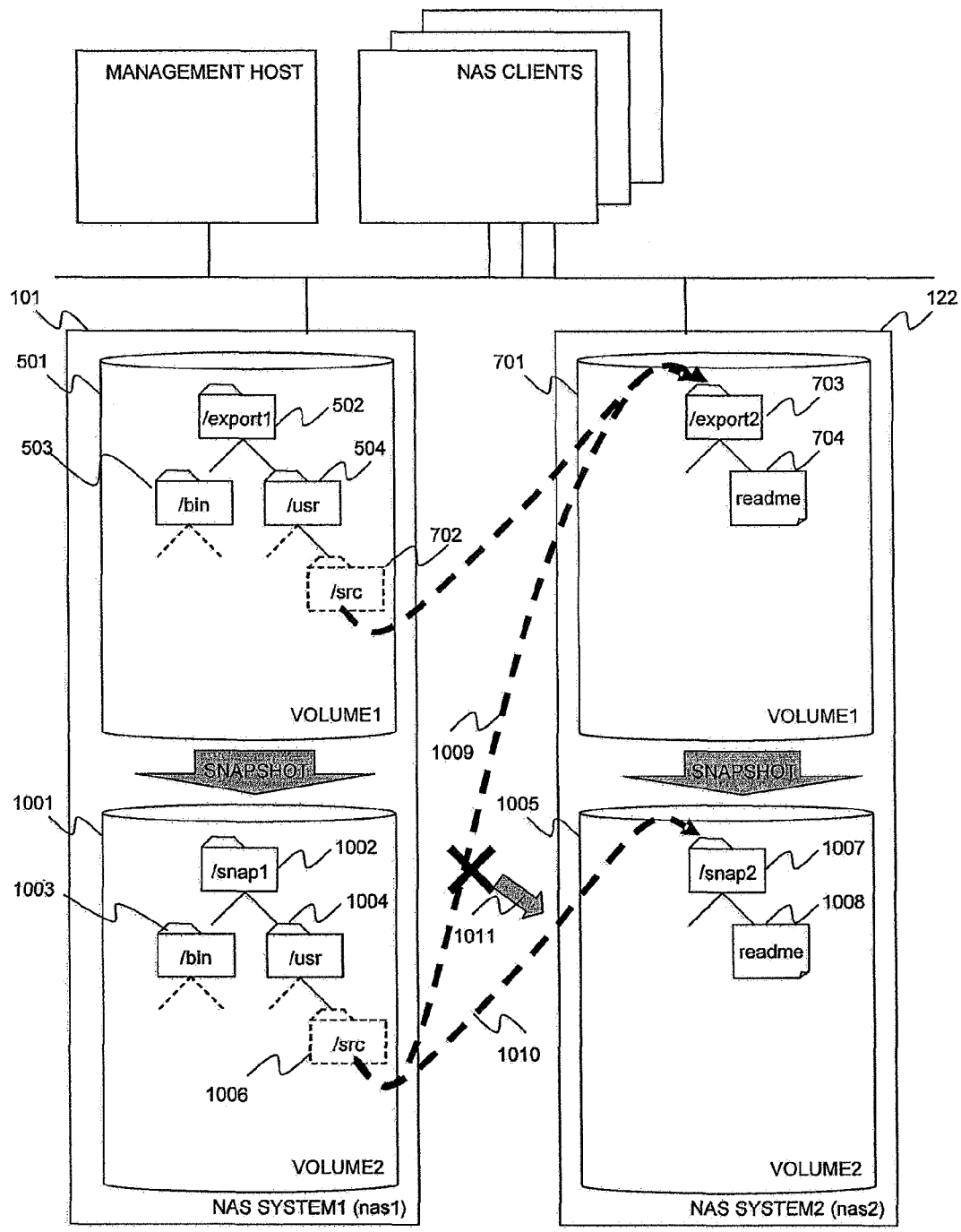
FIG. 13 an exemplary embodiment of a snapshot of a volume including referral.

Inconsistency of Global Name Space in Snapshot Image (Problem Solved in 1st Embodiment):

FIG. 13 explains what occurs when snapshots for each volume containing referrals are taken. In this situation, snapshot for Volume1 501 is taken and mounted onto "/snap1" on the NAS System1 101, and at almost the same time, snapshot for Volume1 701 is taken and mounted at mount point 1007 "/snap2" on the NAS System2 122. The resultant snapshot 1001 on the NAS System1 101 has directories 1002-1004, which correspond to directories 502-504 of the original volume 501. The snapshot volume 1005 on the NAS System2 122 includes "readme" file 1008.

Since the snapshot 1001 is exact the same image of the original volume, the referral in the snapshot volume 1006 still is indicating "nas2:/export2" as the arrow 1009 shows. However, the referral in the snapshot volume 1006 should indicate "nas2:/snap2" as the arrow 1010 shows because the referral is in the snapshot image of the Global File System. Therefore, the information in the referral 1006 in the snapshot volume 1001 should be changed as the arrow 1011 shows so that the referral 1006 indicates the "nas2:/snap2".

Global Name Space Management Table:

The Management Host 113 instructs the NAS Systems 101 and 122 to take a snapshot of a volume. To determine which NAS Systems it has to instruct to keep the snapshot of the Global File System, the Management Host 113 manages the Global Name Space Management Table 1101 shown in FIG. 4.

The Global Name Space Management Table 1101 shows what NAS Systems form the Global File System. There are columns for path in the Global Name Space 1102, target 1103, and path 1104. The target 1130 indicates the hostname of the NAS System which manages the part of the Global File System, and the path 1104 shows the path (mount point) within the NAS System managing the part.

The row 1105 and 1106 shows the situation described in FIG. 10. The row 1105 indicates that the /(root) of the Global File System is managed by NAS System having the hostname "nas1", and its local path on the NAS System is "/export1". And the row 1106 indicates that the files and directories under "/usr/src" within the Global File System is managed by NAS System having the hostname "nas2", and its local path on the NAS System is "/export2".

Figure 14:
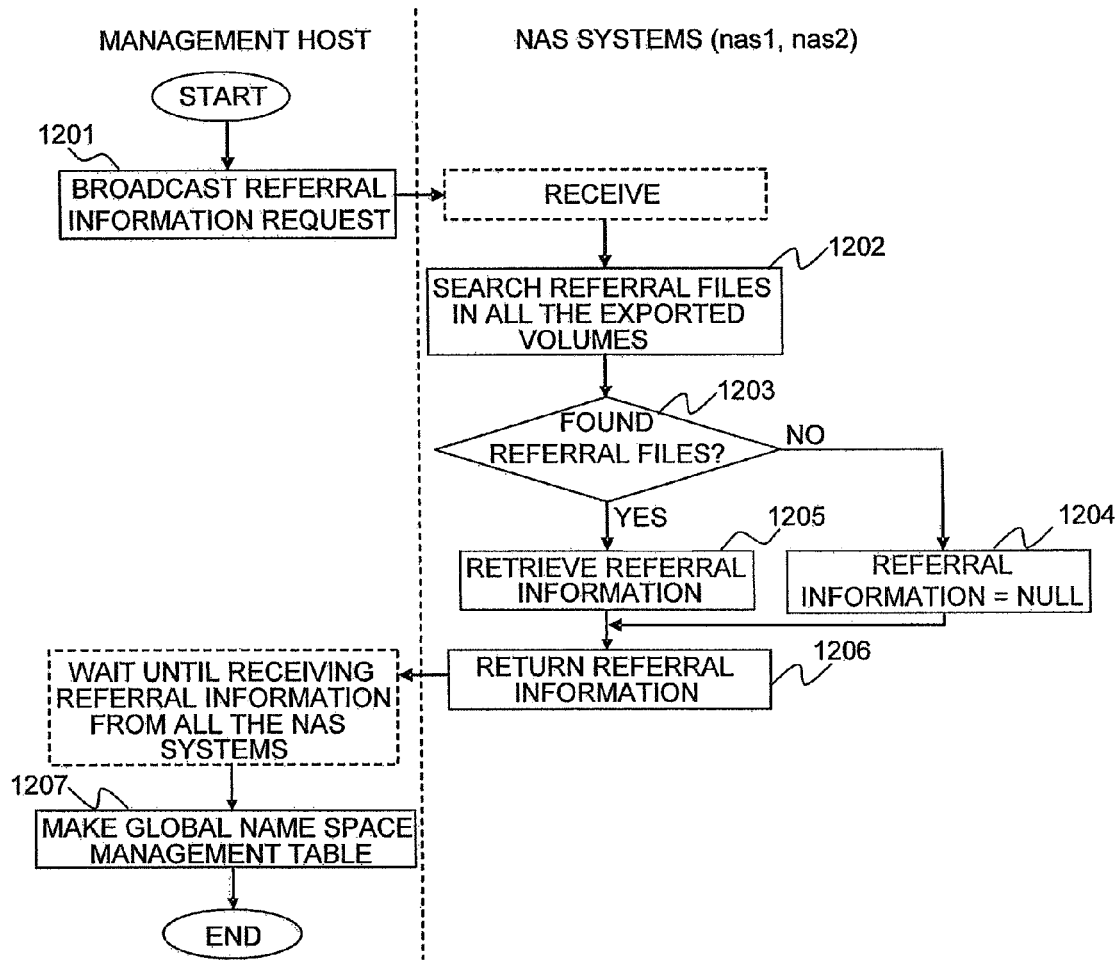
FIG. 14 shows an exemplary flow diagram for collecting referral information.

Flow Diagram of Collecting Information Needed for Global Name Space Management Table:

FIG. 14 shows the flow diagram that the Management Host 113 collects information to make the Global Name Space Management Table 1011 from NAS Systems 101 and 122.

Step 1201: the Management Host 113 broadcasts the referral information request to all the NAS Systems 101 and 122 connected on the LAN 121.

Step 1202: after receiving the referral information request from the Management Host 113, each of the NAS Systems 101 and 122 searches referrals within the volumes exported by each self.

Step 1203: each of the NAS Systems 101 and 122 makes a check weather there are any referral files in the volumes exported by each self.

Step 1204: if the NAS System doesn't find any referral files in the volumes exported by itself, it sets NULL as referral information.

Step 1205: if the NAS System finds referral files in the volumes exported by itself, it retrieves referral information from the referral files.

Step 1206: the NAS System returns the referral information to the Management Host 113.

Step 1207: after receiving the referral information from All the NAS Systems 101 and 122, the Management Host 113 makes the Global Name Space Management Table 1011.

FIG. 15 shows table 2901 with the referral information which each of the NAS Systems 101 and 122 returns to the Management Host 113. Each of the NAS Systems 101 and 122 returns own hostname 2902, local exported directory 2903, local location of referral file 2904, target hostname that the referral file indicates 2905, referral path in the target host that referral file indicates 2906. The row 2907 shows the referral information which the NAS System 101 returns to the Management Host 113. Since the NAS System 101 has the referral file 702 in its volumes as shown in FIG. 13, it retrieves the referral information from the referral file and returns the information to the Management Host 113. On the other hand, since the NAS System 122 doesn't have any referral files in its volumes, it returns the referral information filled with NULL except its own hostname 2902 and its local exported directory 2903 as described in the row 2908.

From the referral information returned from the NAS Systems 101 and 122, The Management Host 113 can find that the NAS System1 101 manages one of the roots of the Global File Systems because any other referral information indicating the local exported directory in the NAS System1 101.

Flow Diagram of instructing Snapshot

When the Management Host 113 instructs the NAS Systems to take a snapshot of a Global File System, the snapshot image should be taken on all the NAS Systems constructing the Global File System at almost the same time. Therefore, the method to instruct all the NAS System to take a snapshot at almost the same time is needed.

Here, two methods are described.

Figure 16:
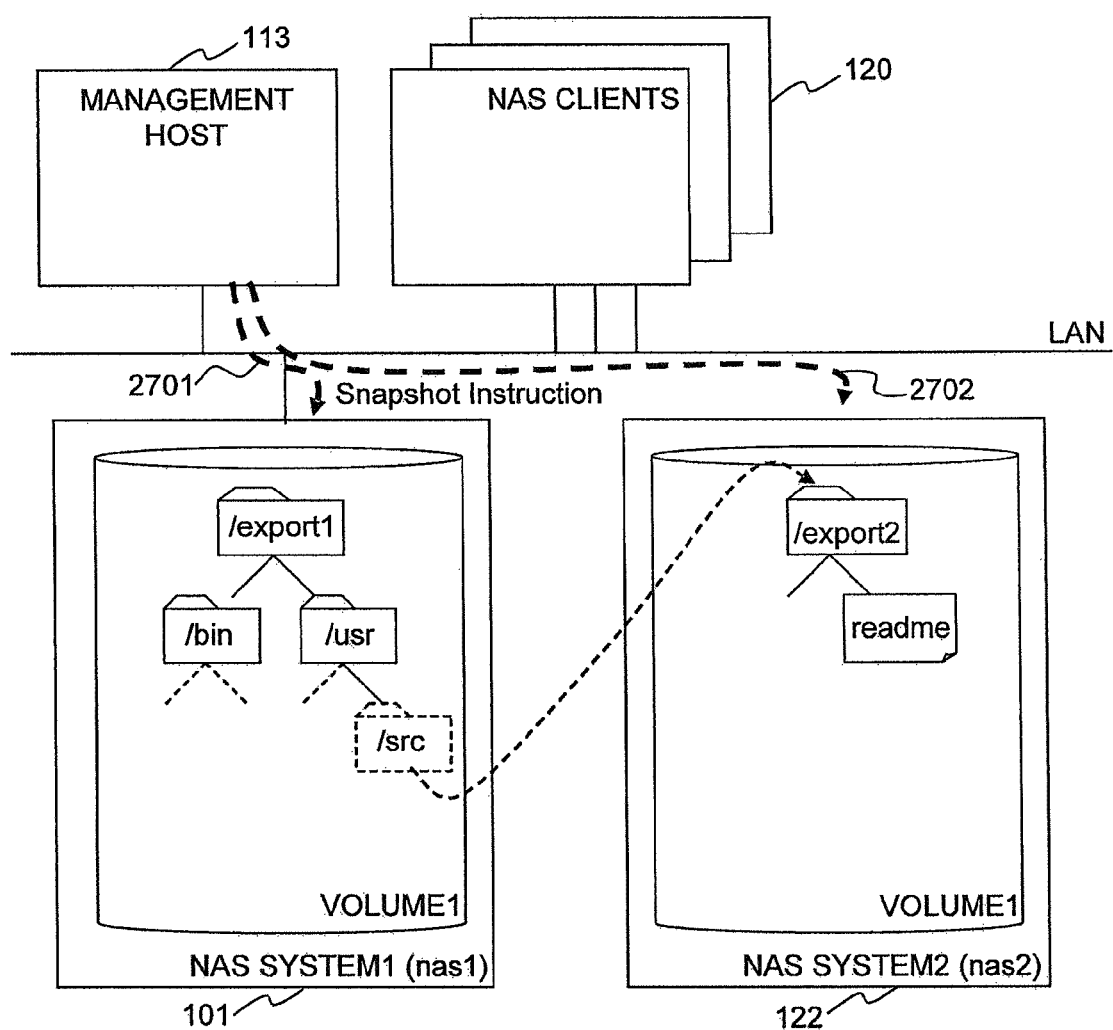
FIG. 16 illustrates an exemplary embodiment of a process for instructing snapshot via instruction broadcast.

1. Instruction Broadcast:

The first method is that the Management Host 113 sends the instruction 2701 and 2702 to all the NAS Systems to take a snapshot of a Global File System as described in FIG. 16.

Figure 17:
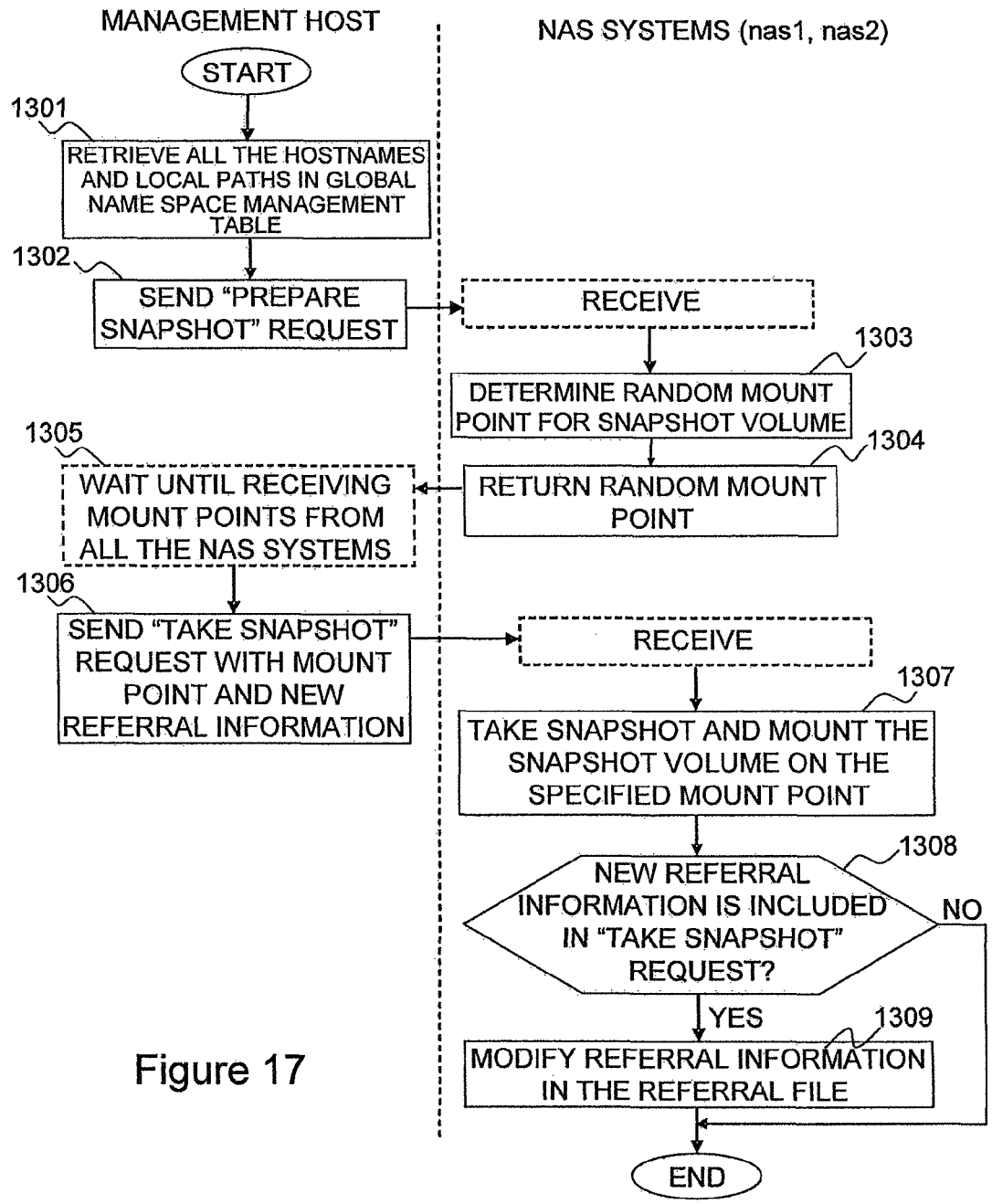
FIG. 17 shows a flow diagram of a process for taking snapshot by instruction broadcast.

FIG. 17 shows the flow diagram that the Management Host 113 instructs the NAS Systems to take a snapshot by this method.

Step 1301: the Management Host 113 retrieves all the hostnames and the paths from the Global Name Space Management Table 1101.

Step 1302: the Management Host 113 sends PREPARE SNAPSHOT request to all the hosts whose hostname were found in the Global Name Space Management Table 1101 in Step 1301. The request includes the target volume to take snapshot like "/export1" or "/export2".

Step 1303: after receiving the PREPARE SNAPSHOT request from the Management Host 113, each of the NAS Systems 101 and 122 prepares snapshot volumes and random mount points for the snapshot volumes. Here, random mount points must not be the same mount points that already exist within the NAS System.

Step 1304: each of the NAS Systems 101 and 122 returns the random mount points determined in step 1303 to the Management Host 113.

Step 1305: the Management Host 113 waits until receiving the response from all the NAS Systems to which it sent the PREPARE SNAPSHOT request. The Management Host 113 adds the mount point for the snapshot volume in the Global Name Space Management Table 1101. In the example shown in FIG. 13, the Global Name Space Management Table 1101 becomes the table 1401 in FIG. 18. Columns 1102, 1103 and 1104 of table 1101 correspond to columns 1402, 1403 and 1404 of table 1401. New column 1405 of table 1401 contains information on the snapshot path. Rows 1406 and 1407 contain exemplary name space information.

Step 1306: the Management Host 113 sends TAKE SNAPSHOT request to all the hosts whose hostname were found in the Global Name Space Management Table 1101 in Step 1301. The TAKE SNAPSHOT request includes the information 3001 shown in FIG. 19. There are the subject volume 3002 and the snapshot mount point 3003 which is determined by each of the NAS Systems for the snapshot volume. Also, The TAKE SNAPSHOT request includes the referral information to which the referral file in the snapshot volume should be changed after the snapshot is taken and mounted. There are the subject referral file 3004, the new target 3005 and the new path 3006. If there are more than 2 referral files to be changed, the information in the columns 3004, 3005 and 3006 will be added for the other referral files. In FIG. 19, the row 3007 shows the information included in the TAKE SNAPSHOT request sent to the NAS System1 101, and the row 3008 is the one sent to the NAS System2 122.

Step 1307: after receiving the TAKE SNAPSHOT request from the Management Host 113, each of the NAS Systems 101 and 122 takes the snapshot, and mounts the snapshot volume onto the specified mount point.

Step 1308: in each of the NAS Systems 101 and 122, a check is made whether the new referral information is included in the TAKE SNAPSHOT request. If the new referral information is not included, each of the NAS Systems 101 and 122 ends the process.

Step 1309: if the new referral information is included in the TAKE SNAPSHOT request, the NAS System changes the referral information in the specified referral file to the new referral information specified in the request.

Figure 20:
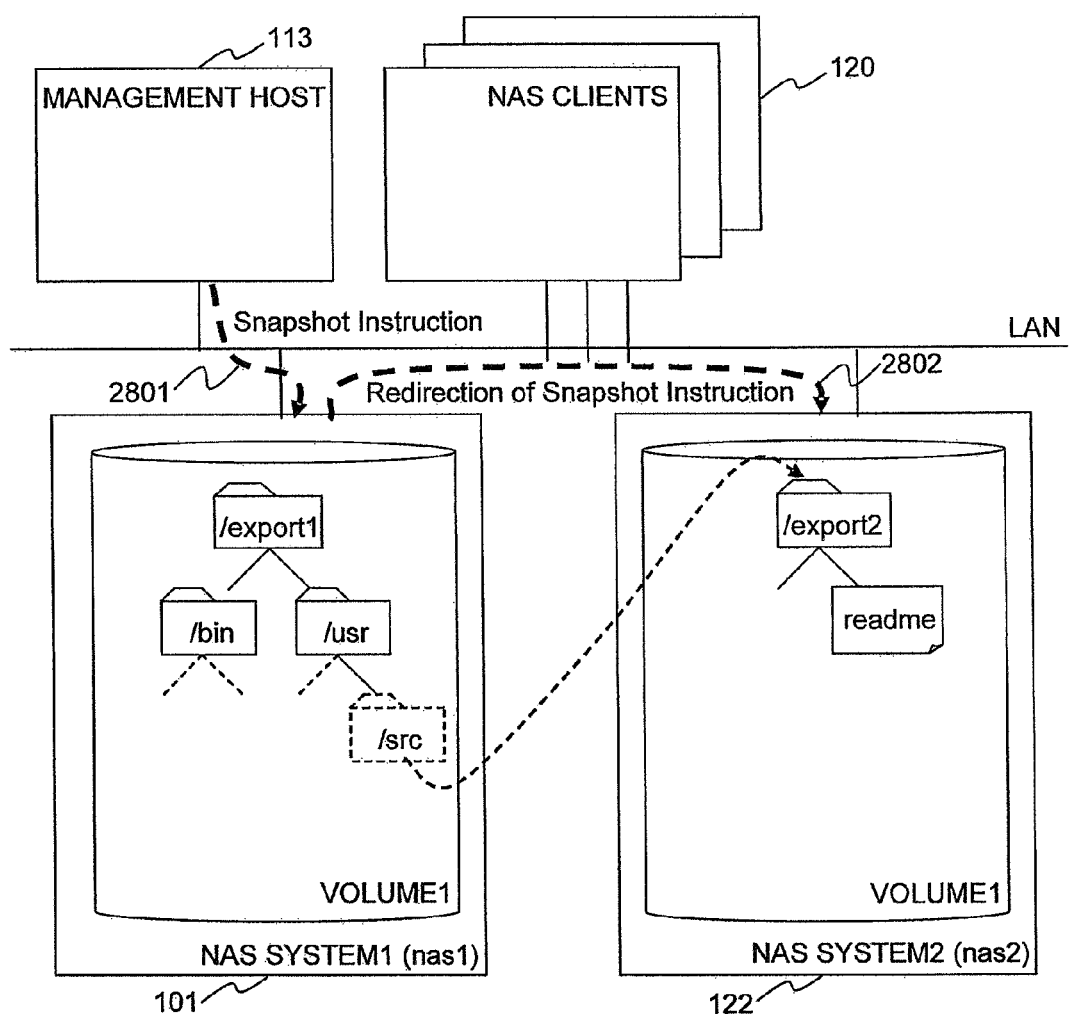
FIG. 20 shows an instructing snapshot via instruction redirection.

2. Instruction Redirection:

The second method is that the Management Host 113 instructs (at 2801) only the NAS System having the root of the Global File System (here, we call the NAS System as the Root NAS System, in this case, the NAS System1 101 corresponds to it), and then the Root NAS System redirects the instruction (at 2802) to the other NAS System which the referral in the Root NAS System indicates. The second method is described in FIG. 20.

Figure 21:
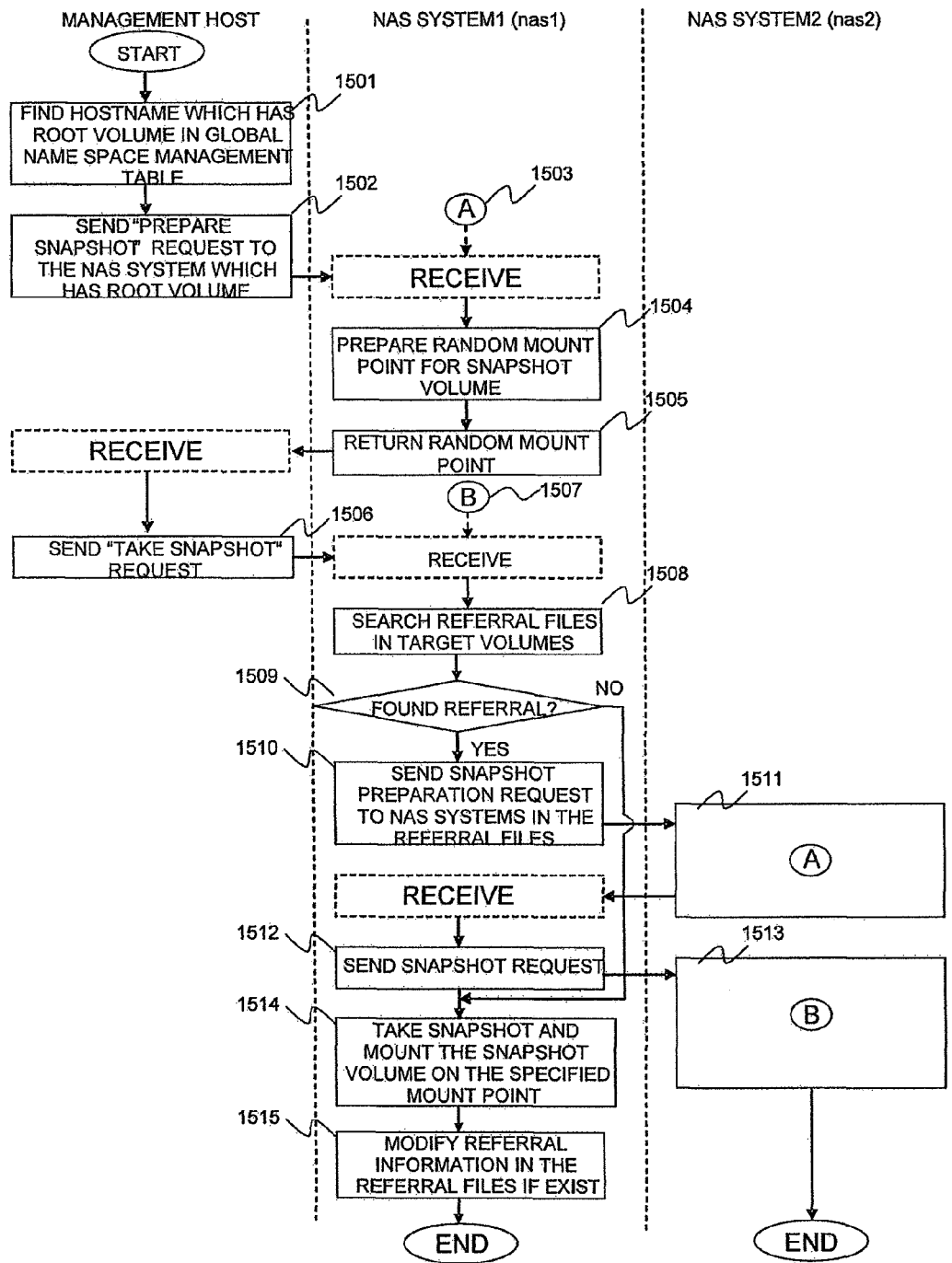
FIG. 21 shows a flow diagram of taking snapshot by instruction redirection.

FIG. 21 shows the flow diagram that the Management Host 113 instructs the Root NAS System to take a snapshot via Instruction Redirection.

Step 1501: the Management Host 113 finds the hostname of the NAS System which has the root of the Global File System (In this case, the NAS System1 corresponds to it), and the path within the NAS System.

Step 1502: the Management Host 113 sends "PREPARE SNAPSHOT" request to the NAS System1 101. The request includes the target volume to take snapshot like "/export1".

Step 1504: after receiving the "PREPARE SNAPSHOT" request, the NAS System1 101 prepares snapshot volumes and random mount points for the snapshot volumes. Here, random mount points must not be the same mount points that already exist within the NAS System1 101.

Step 1505: the NAS System1 101 returns the determined mount points to the Management Host 113.

Step 1506: After receiving the mount points from the NAS System1 101, the Management Host 113 sends TAKE SNAPSHOT request to the NAS System1 101.

Step 1507: after receiving the TAKE SNAPSHOT request from the Management Host 113, the NAS System1 101 searches referral files in the snapshot target volumes.

Step 1508: The NAS System1 101 made a check weather any referral files are found in the target volumes. If no referral files are found, then it proceeds to step 1513.

Step 1509: If referral files are found, the NAS System1 101 sends PREPARE SNAPSHOT request to the NAS Systems that the referral files indicates as the targets. In this case, it sends the request to the NAS System2 122.

Step 1511: After receiving the PREPARE SNAPSHOT request from the NAS System1 101, the NAS System2 122 processes the same steps from step 1503 to step 1505, and returns the random mount point to the NAS System1 101.

Step 1512: After receiving the random mount points from the NAS System2 122, the NAS System1 101 sends the TAKE SNAPSHOT request to the NAS System2 122.

Step 1513: After receiving the TAKE SNAPSHOT request from the NAS System1 101, the NAS System2 122 processes the same steps from step 1507 to step 1515.

Step 1514: The NAS System1 101 takes snapshots of the specified target volumes and mounts the snapshot volumes onto the specified mount points.

Step 1515: The NAS System1 101 modified the referral files in the snapshot volumes if exists so that the referral files indicate the snapshot volumes on the NAS System2 122. The target and the path that the referral files should be changed to is retrieved as the target host to send PREPARE SNAPSHOT request in step 1510, and the random mount point received from the NAS System2 122 in response to the PREPARE SNAPSHOT request.

Forming New Referral Information without Changing the Referral Files:

In the flow diagrams described in FIGS. 17 and 21, the NAS Systems change the referral information in the referral files themselves in step 1309 and step 1515. However, there is a method to change the referral information without changing the referral files themselves. It can be implemented in the way that the NAS Systems keep the Referral Management Table 1601 shown in FIG. 3, and returns the new referral information at the time when clients try to access the referral files.

Figure 22:
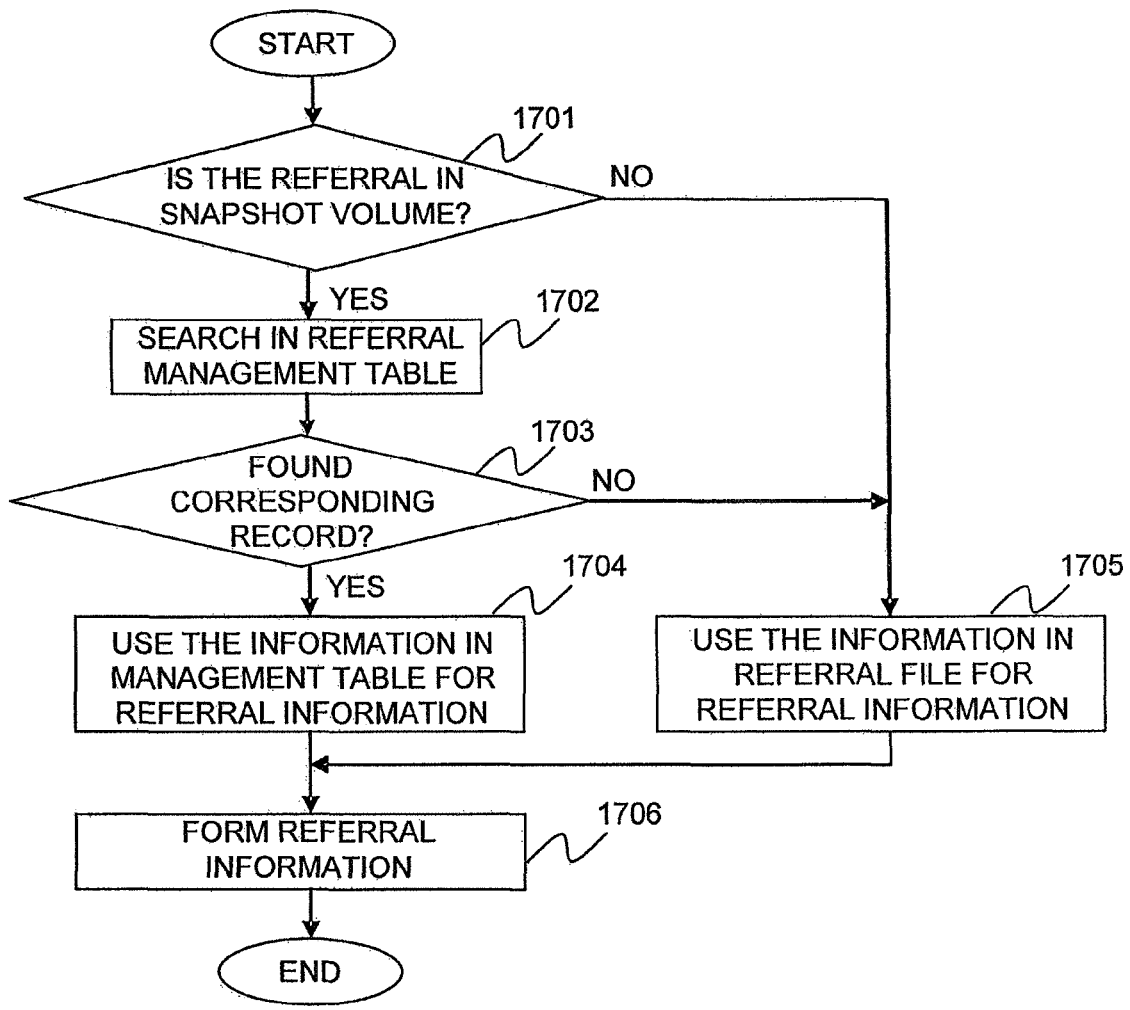
FIG. 22 shows an exemplary process for formation of new referral information.

Flow Diagram of Forming Referral Information (without Changing the Referral Files):

FIG. 22 shows the flow diagram that the NAS Systems form the new referral information when they receives access request to the referral files in the snapshot volumes from clients.

Step 1701: the NAS System checks if the referral file the client is trying to access is in a snapshot volume or not. If yes, it proceeds to step 1702. If not, it proceeds to step 1705.

Step 1702: the NAS System searches corresponding record in the Referral Management Table 1601 using the path and filename of the referral file as the key.

Step 1703: A check is made if the corresponding record was found in the Referral Management Table 1601 in step 1702. If yes, it proceeds to step 1704. If no, it proceeds to step 1705.

Step 1704: If there is a corresponding record for the referral file, the NAS System uses the information on the Referral Management Table 1601 to form the response to the client.

Step 1705: If the referral file the client is trying to access is not in a snapshot volume, or if there is not a corresponding record for the referral file on the Referral Management Table 1601, the NAS System uses the information in the referral file to form the response to the client.

Step 1706: the NAS System returns the response to the client.

2nd Embodiment

System Configuration

Figure 23:
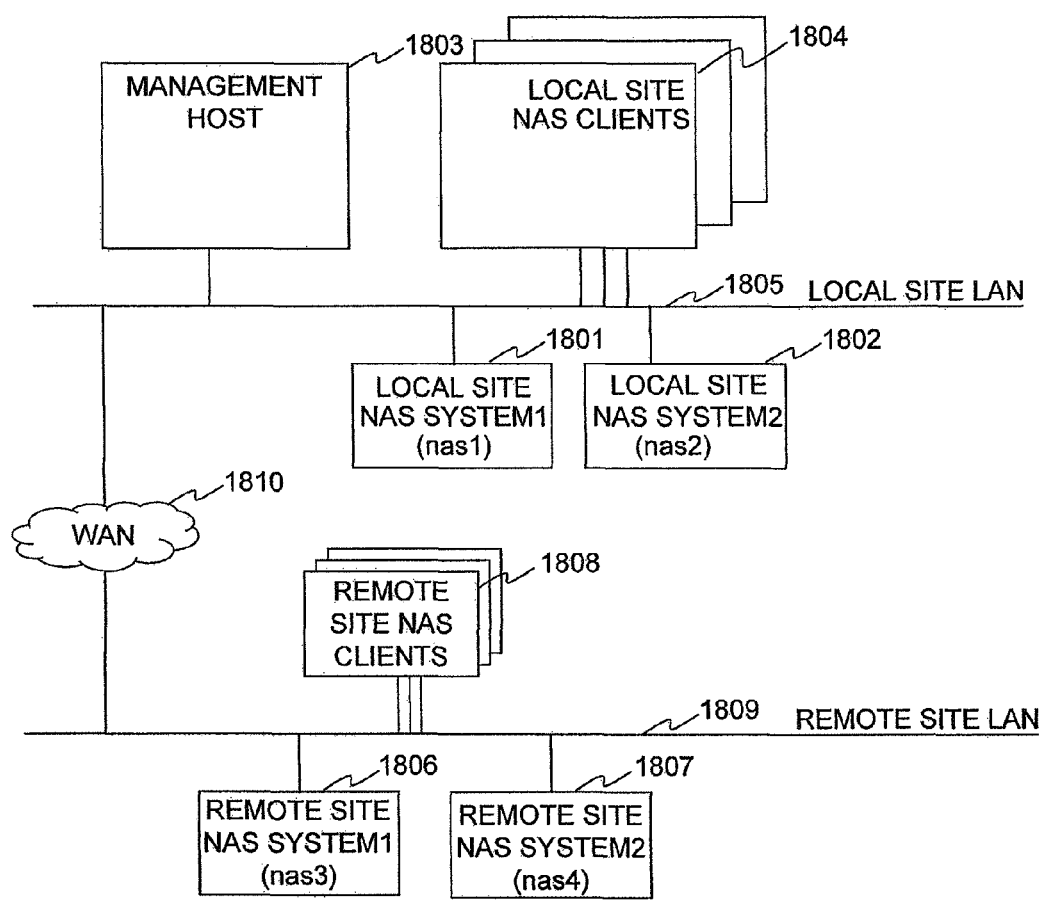
FIG. 23 shows an exemplary system configuration according to the second embodiment of the inventive concept

FIG. 23 shows an example configuration of the system in which the methods and apparatus in 2nd embodiment are applied. The system is composed of a plurality of Local Site NAS Systems 1801 and 1802, a plurality of Remote Site NAS Systems 1806 and 1807, a Management Host 1803, one or more Local Site NAS Clients 1804 executing NFSv4 client software 1907, and one or more Remote Site NAS Clients 1808.

Each of NAS System 1801, 1802, 1806 and 1807 has the same components as the NAS System 101 and 102 in the 1st embodiment.

Management Host 1803 has the same components as the Management Host 113 in the 1st embodiment.

Each of NAS Client 1804 and 1808 has the same components as the NAS Clients 120 in the 1st embodiment.

Local Site NAS Systems 1801 and 1802, Management Host 1803, and Local Site NAS Clients 1804 are connected each other via Local Site LAN 1805, and Remote Site NAS Systems 1806 and 1807, and Remote Site NAS Clients 1808 are connected each other via Remote Site LAN 1809. Also, Local Site LAN 1805 and Remote Site LAN 1809 are connected each other over via WAN 1810 so that Local Site NAS Systems 1801 and 1802 can transfer data to Remote Site NAS Systems 1806 and 1807. Local Site NAS System1 1801 has the hostname "nas1", and Local Site NAS System2 1802 has the hostname "nas2" on the network. Also, Remote Site NAS System1 1806 has the hostname "nas1", and Remote Site NAS System2 has the hostname "nas4" on the network.

Here, it is assumed that basic configuration for remote copy between Local Site and Remote Site is completed. The Local Site NAS System1 1801 is associated to the Remote Site NAS System 1806, and the Local Site NAS System 1802 is associated to the Remote Site NAS System 1807.

Figure 24:
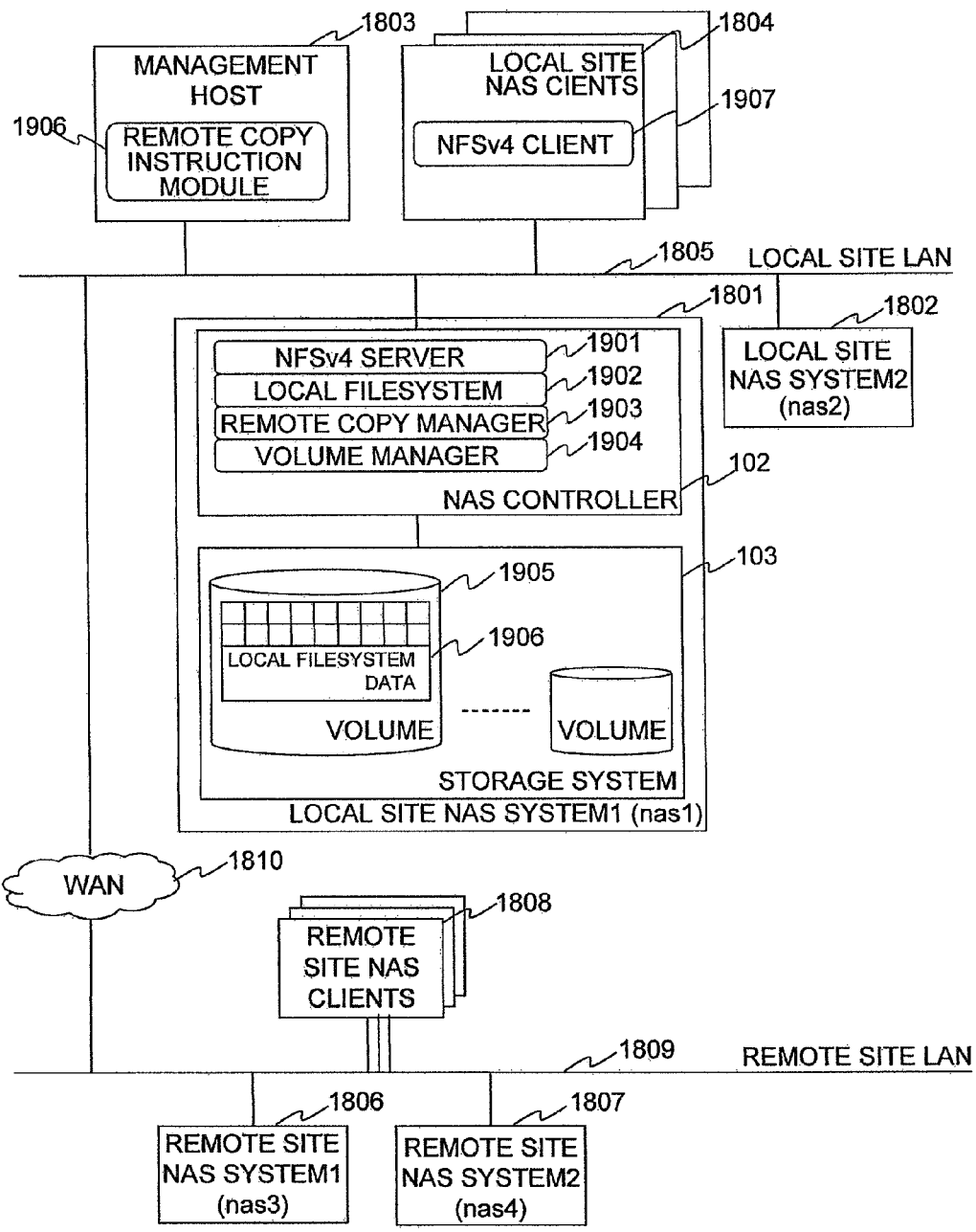
FIG. 24 shows an exemplary module configuration according to the second embodiment of the inventive concept.

Functional Diagram:

FIG. 24 shows a functional diagram of the system in 2nd embodiment.

In the NAS Controller 102 in each of NAS Systems 1801, 1802, 1806 and 1807, there are NFSv4 Server 1901, Local File System 1902, Remote Copy Manager 1903, and Volume Manager 1904.

NFSv4 Server 1901 exports files (makes the files accessible) via NFS version 4 protocol in volumes that Local File System 1902 mounts. Also, unlike usual NFS version 4 protocol, NFSv4 Server 1901 returns changed referral information based on Referral Management Table 2301 shown in FIG. 25.

Local File System 1902 receives file I/O requests from NFSv4 Server 1901, and issues appropriate block I/O request to Volume Manager 1904.

Remote Copy Manager 1903 sets up a remote copy of a volume on an associated Remote Site NAS System in accordance with an instruction from Management Host 1803 or other Local Site NAS System 1801 or 1802. Also, Remote Copy Manager 1903 searches referrals in volumes in accordance with an instruction from Management Host 1803, and returns the referral information to Management Host 1803. Moreover, Remote Copy Manager 1803 manages Referral Management Table 2301 shown in FIG. 25, which includes, for each referral file in column 2302, information on the new target in column 2303 as well as new path in column 2304.

Volume Manager 1904 creates one or more Volumes 1905 using one or more Disk Drives 111 in Storage System 103.

In the Management Host 1803, there is Remote Copy Instruction Module 1906.

Remote Copy Instruction Module 1906 collects referral information from Local Site NAS Systems 1801 and 1802, and manages Global Name Space Management Table 2101 shown in FIG. 26. Table 2101 includes global name space path column 2102, target storage system column 2103, target path column 2104, remote copy target storage system column 2105, as well as the remote copy path column 2106. Also, Remote Copy Instruction Module 1906 instructs Local Site NAS Systems 1801 and 1802 to set up a remote copy of a volume on an associated Remote Site NAS System 1806 or 1807.

Remote Copy:

Remote Copy is a mechanism to keep a synchronized or asynchronized copy of a volume on a remotely deployed file server or a NAS System.

In the Remote Copy mechanism, a volume (secondary volume) that has the same size as the original volume (primary volume) is prepared on the remotely deployed file server or a NAS System, and the secondary volume is associated with the primary volume. After the secondary volume is associated with the primary volume, all the data in the primary volume is copied to the secondary volume (initial copy). After the initial copy is completed, all the write I/Os to the primary volume are sent to the secondary volume, and applied to it.

There are various methods to implement remote copy mechanism. Server-based block remote copy is one of the popular implementations of the Remote Copy mechanism. An example of server-based block remote copy is the method to perform Remote Copy function on the NAS Controller of the NAS System. In this method, the volume manager on the NAS Controller transfers all the write block I/O applied to the primary volume to the secondary volume on the remotely deployed NAS System via WAN.

Figure 27:
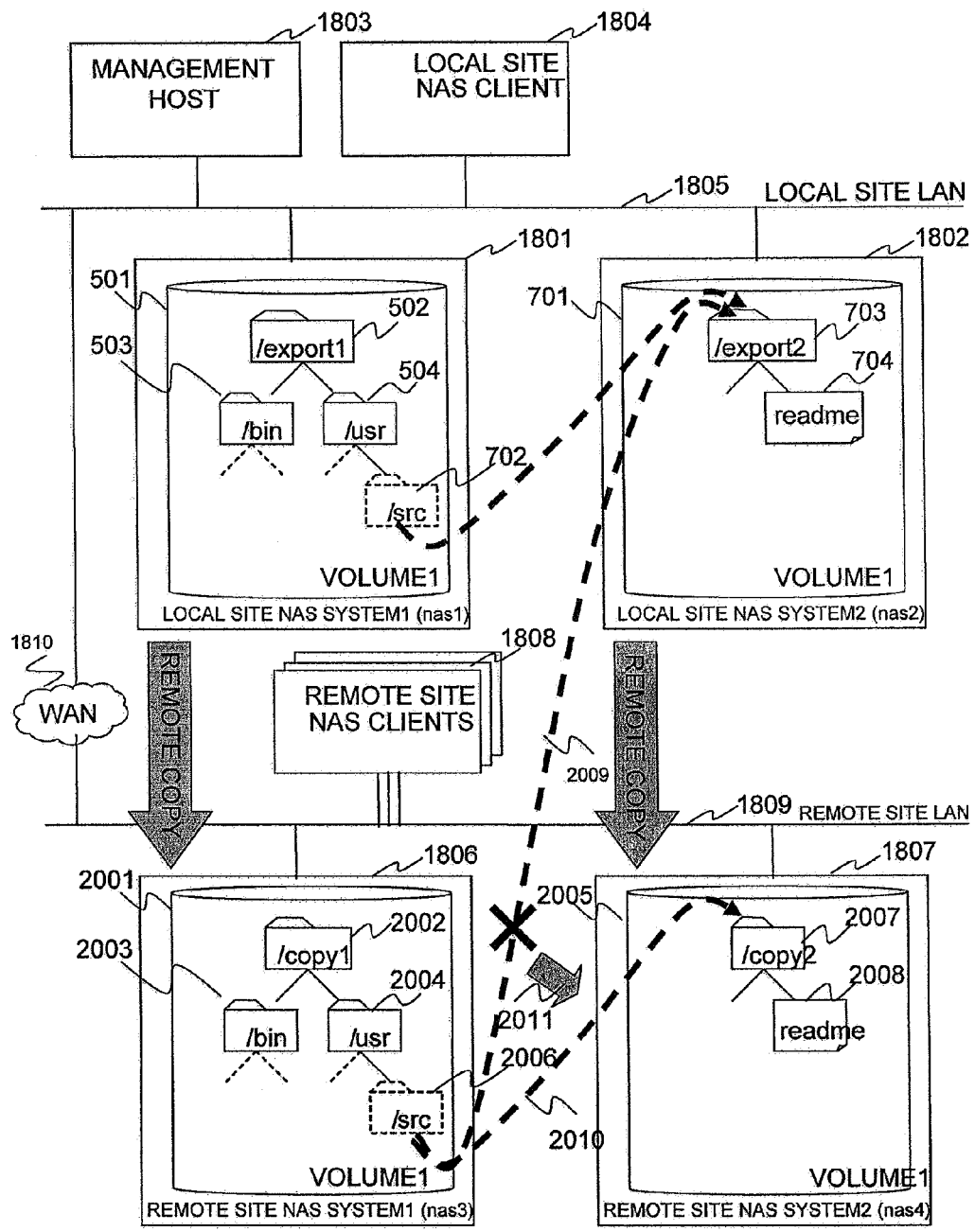
FIG. 27 illustrates an exemplary embodiment of a process for taking of a remote copy of a volume including referral.

Inconsistency of Global Name Space in Remote Copy Image (Problem Solved in 2nd Embodiment):

FIG. 27 explains what occurs when remote copy image for each volume containing referrals are set up. In this situation, remote copy image for Volume1 501 on the Local Site NAS System1 1801 is set up on the Remote Site NAS System1 1806 and mounted at mount point 2002 "/copy1", and at almost the same time, remote copy image for Volume1 701 on the Local Site NAS System2 1802 is set up as volume1 2005 and mounted at mount point 2007 "/copy2" on the Remote Site NAS System2 1807. The remote copy volume 2001 contains directories 2003 and 2004, which correspond to directories 503-504 of the target volume 501. The volume1 2005 contains "readme" file 2008.

Since the remote copy makes exact the same image of the Volume1 501 and Volume2 701 on the Remote Site NAS Systems 1806 and 1807, the referral in the Volume 2001 still indicates "nas2:/export2" as the arrow 2009 shows. However, the referral in the snapshot volume 1006 should indicate "nas4:/copy2" as the arrow 2010 shows because the referral is in the remote copy image of the global file system. Therefore, the information in the referral 2006 in the remote copy volume 2001 must be changed as the arrow 2011 shows so that the referral 2006 indicates the "nas4:/copy2".

Global Name Space Management Table:

The Management Host 1803 instructs the Local Site NAS Systems 1801 and 1802 to set up remote copy of a volume. To determine which Local Site NAS Systems it has to instruct to keep the remote copy image of the Global File System, the Management Host 1803 manages the Global Name Space Management Table 1101 shown in FIG. 4 (the same table as the 1st embodiment).

Flow Diagram of Collecting Information Needed for Global Name Space Management Table:

The flow diagram is the same as FIG. 12 for 1st embodiment.

Flow Diagram of Setting up Remote Copy

When the Management Host 1803 instructs the Local Site NAS Systems to set up a remote copy of a Global File System, the remote copy image must be set up on all the Local Site NAS Systems constructing the Global File System. Therefore, the method to instruct all the Local Site NAS System to set up a remote copy is needed.

Herein, two methods are described.

1. Instruction Broadcast:

The first method is that the Management Host 1803 instructs all the Local Site NAS System to set up a remote copy. The method is similar to the one described in FIG. 16 for the 1st embodiment.

Step 2201: the Management Host 1803 retrieves all the hostnames and the paths from the Global Name Space Management Table 1101.

Step 2202: the Management Host 1803 sends PREPARE REMOTE COPY request to all the hosts whose hostname were found in the Global Name Space Management Table 1101 in Step 2201. The request includes the target volume to take snapshot like "/export1" or "/export2".

Step 2203: after receiving the PREPARE REMOTE COPY request from the Management Host 1803, each of the Local Site NAS Systems 1801 and 1802 transfers the request to the Remote Site NAS Systems 1806 or 1807 that each of the Local Site NAS Systems 1801 and 1802 is associated to.

Step 2204: after receiving the PREPARE REMOTE COPY request transferred from each of the Local Site NAS Systems 1802 and 1802, each of the Remote Site NAS Systems 1806 and 1807 prepares remote copy volumes and random mount points for the remote copy volumes. Here, random mount points must not be the same mount points that already exist within each of the Remote Site NAS Systems 1806 and 1807.

Step 2205: each of the Remote Site NAS Systems 1806 and 1807 returns the random mount points to the each of the Local Site NAS Systems 1801 and 1802.

Step 2206: after receiving the response from each of the Remote Site NAS Systems 1806 and 1807, each of the Local Site NAS Systems 1801 and 1802 transfers the response to the Management Host 1803. Also it sends the hostname of the remote copy target (Remote Site NAS System 1806 or 1807) to the Management Host 1803.

Step 2207: the Management Host 1803 waits until receiving the return message from all the Local Site NAS Systems to which it sent the PREPARE REMOTE COPY request. The Management Host 1803 adds the mount point for the remote copy volume in the Global Name Space Management Table 1101. In the example shown in FIG. 27, the Global Name Space Management Table 1101 becomes the table 2101 in FIG. 26.

Figure 28:
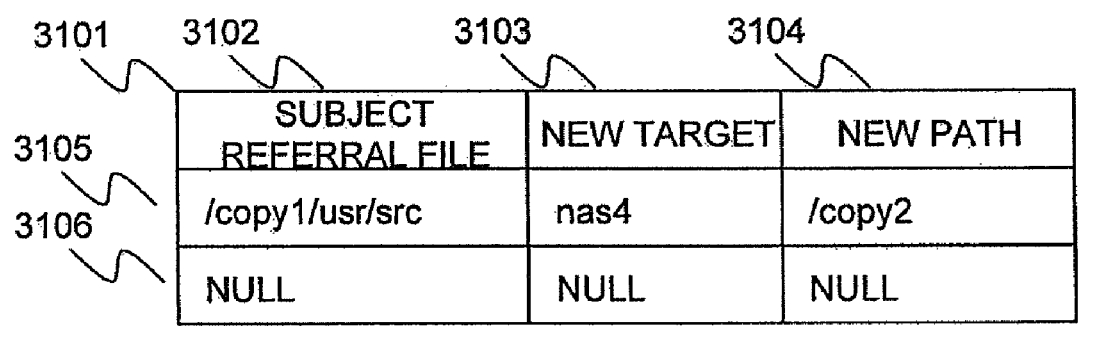

Step 2208: the Management Host 1803 sends SETUP REMOTE COPY request to all the hosts whose hostname were found in the Global Name Space Management Table 1101 in step 2201. The SETUP REMOTE COPY request includes the new referral information 3101 shown in FIG. 28. There are the subject referral file 3102, the new target 3103, and the new path 3104 to which the subject referral file in the secondary volume should be changed to. If there are more than 2 referral files to be changed, the information in the rows are added for the rest of the referral files. In FIG. 28, the row 3105 shows the information included in the SETUP REMOTE COPY request sent to the Local Site NAS System 1801, and the row 3106 is the one sent to the Local Site NAS System 1802.

Step 2209: after receiving the "SETUP REMOTE COPY" request from the Management Host 1803, each of the Local Site NAS Systems 1801 and 1802 sets up remote copy between itself and the Remote Site NAS System which it is associated to.

Step 2210: each of the Local Site NAS Systems 1801 and 1802 sends notification that setting up is completed to each of the Remote Site NAS Systems 1806 and 1807. The notification includes the new referral information sent from the Management Host 1803.

Step 2211: after receiving the notification from each of the Local Site NAS Systems 1801 and 1802, each of the Remote Site NAS Systems 1806 and 1807 makes the Referral Management Table 2301 shown in FIG. 25 based on the new referral information sent.

2. Instruction Redirection:

The second method is that the Management Host 1803 instructs only the Local Site NAS System having the root of the Global File System (here, we call Root Local Site NAS System), and then the Root Local Site NAS System redirects the instructions to the other Local Site NAS System which the referral in the Root Local Site NAS System indicates. The second method is similar to the one described in FIG. 20 for the 2nd embodiment.

Step 2501: the Management Host 1803 finds the hostname of the NAS System which has the root of the Global File System (In this case, the Local Site NAS System1 1801 corresponds to it), and the path within the NAS System.

Step 2502: the Management Host 1803 sends PREPARE REMOTE COPY request to the Local Site NAS System1 1801. The request includes the target volume to setup remote copy like "/export1".

Step 2504: after receiving the PREPARE REMOTE COPY request, the Local Site NAS System1 1801 transfers the request to the Remote Site NAS System 1806 that the Local Site NAS System 1801 is associated to.

Figure 29:
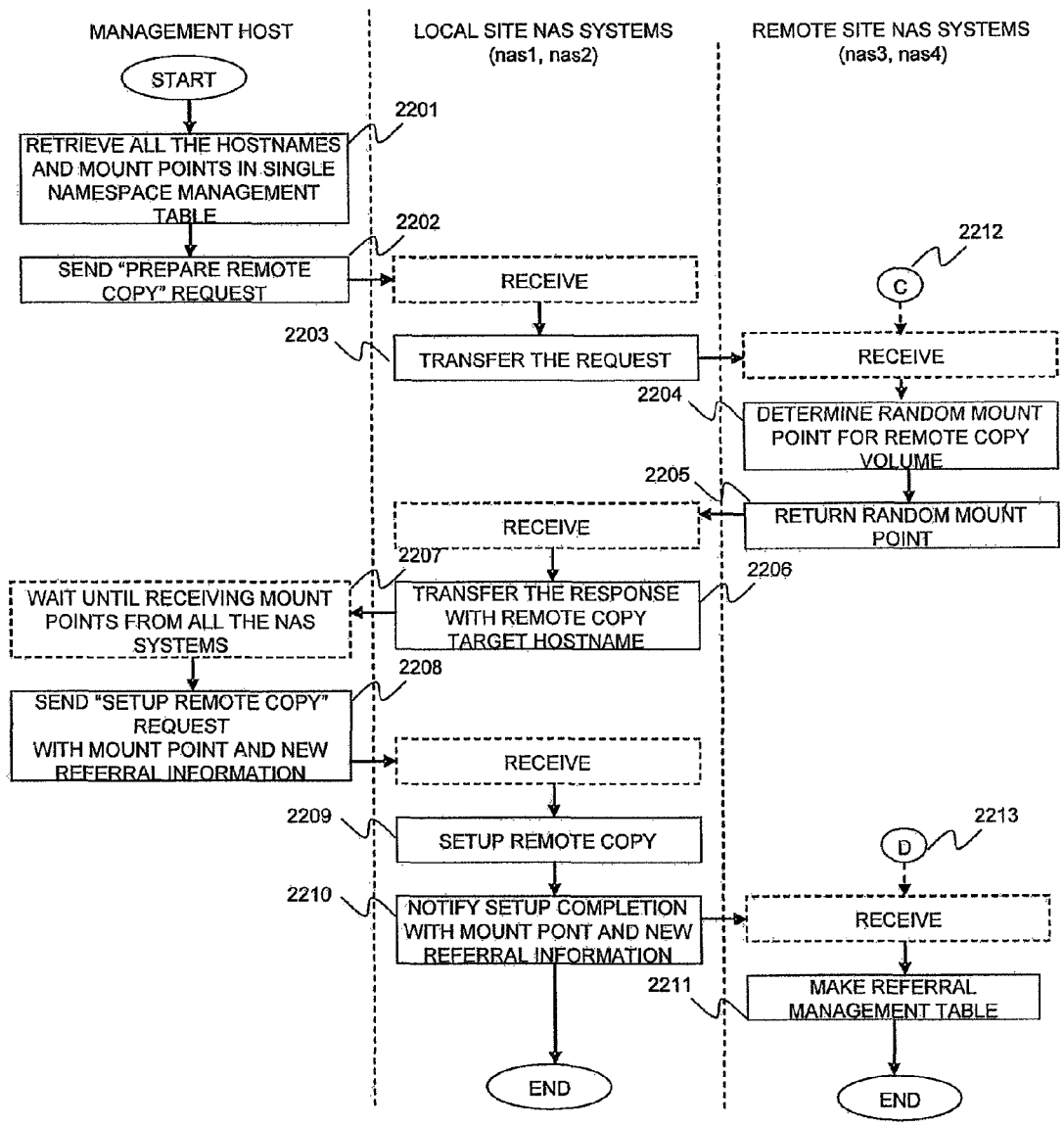
FIG. 29 shows a flow diagram of an exemplary embodiment of a process for setting up remote copy by instruction broadcast.

Step 2505: the Remote Site NAS System 1806 processes in the same steps from step 2212 to step 2205 shown in FIG. 29.

Step 2507: the Local Site NAS System 1801 transfers the response to the Management Host 1803. Also it sends the hostname of the remote copy target (Remote Site NAS System1 1806) to the Management Host 1803.

Step 2508: the Management Host 1803 sends SETUP REMOTE COPY request to the Local Site NAS System1 1801. The request includes target volume to set up remote copy.

Step 2510: the Local Site NAS System1 1801 searches referral files in the specified volume.

Step 2511: the Local Site NAS System1 1801 makes check whether any referral files are found in the specified volume. If no referral files are found, then it process to step 2517.

Step 2512: the Local Site NAS System1 1801 sends PREPARE REMOTE COPY request to the targets in the referral files. In the example shown in FIG. 27, it sends the request to Local Site NAS System2 1802.

Step 2513: the Local Site NAS System2 1802 processes the same steps from step 2503 to step 2507, and returns random mount point and remote copy target hostname to the Local Site NAS System1 1801.

Step 2514: the Local Site NAS System1 1801 sends SETUP REMOTE COPY request to the targets in the referral files. In the example shown in FIG. 27, it sends the request to the Local Site NAS System2 1802.

Step 2515: the Local Site NAS System2 1802 processes the same steps from step 2509 to end.

Step 2516: the Local Site NAS System1 1801 sets up remote copy between itself and the Remote Site NAS System1 1806.

Step 2517: the Local Site NAS Systems 1801 sends notification that setting up is completed to the Remote Site NAS Systems 1806. The notification includes the new referral information that can be known from the response to the PREPARE REMOTE COPY request sent to the Local Site NAS System2 1802 in step 2512.

Step 2518: the Remote Site NAS System 1806 processes the same steps from step 2213 to step 2211 in FIG. 29.

Figure 30:
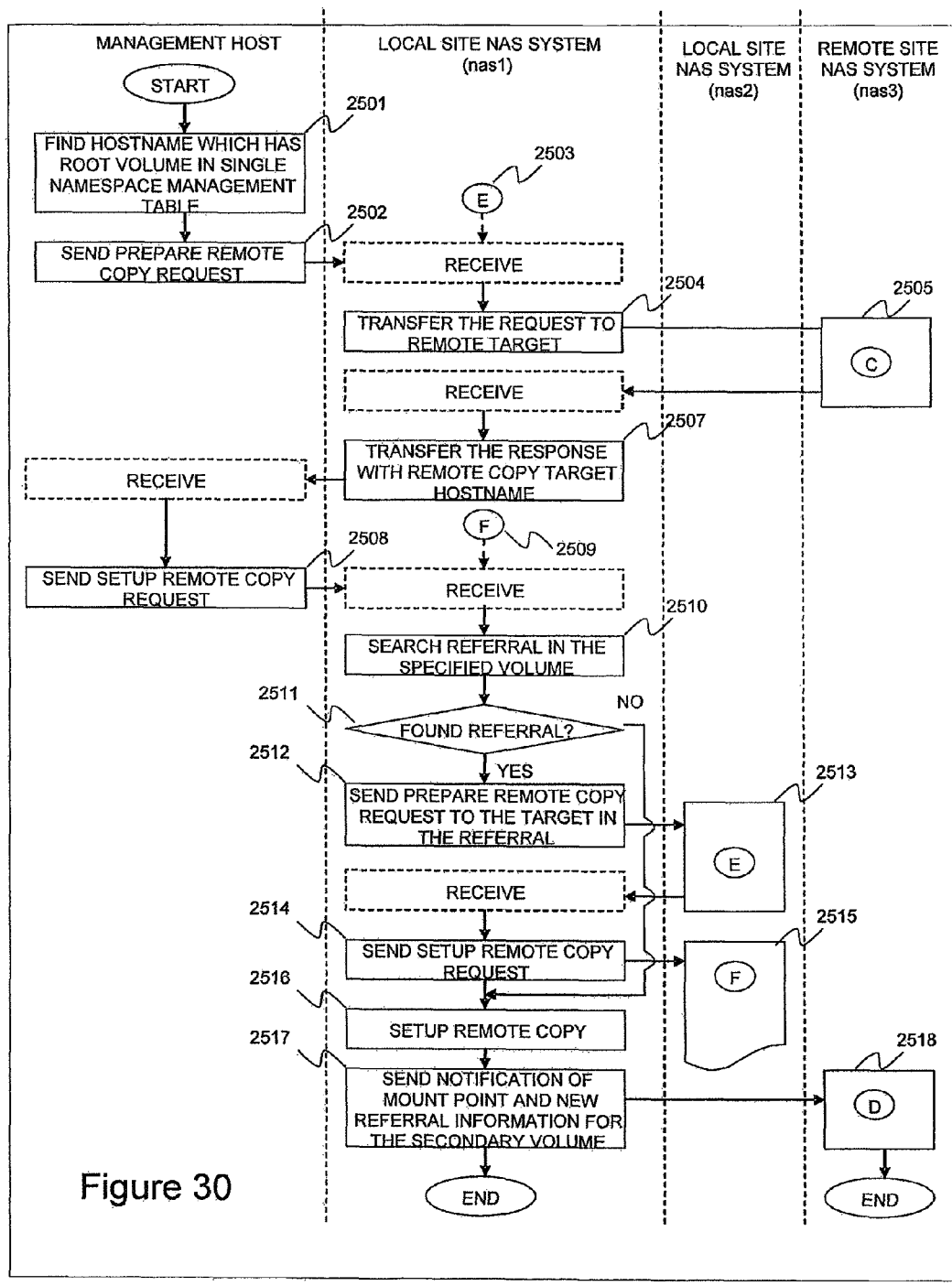
FIG. 30 shows a flow diagram of an exemplary embodiment of a process for setting up remote copy by instruction direction.

Flow Diagram of Forming New Referral Information:

The Remote Site NAS Systems makes the Referral Management Table 2301 shown in FIG. 25 during the process described in FIGS. 29 and 30. When the Remote Site NAS Systems receives access request to the referral files in secondary volumes from clients, they form the new referral information based on the Referral Management Table 2301.

Figure 31:
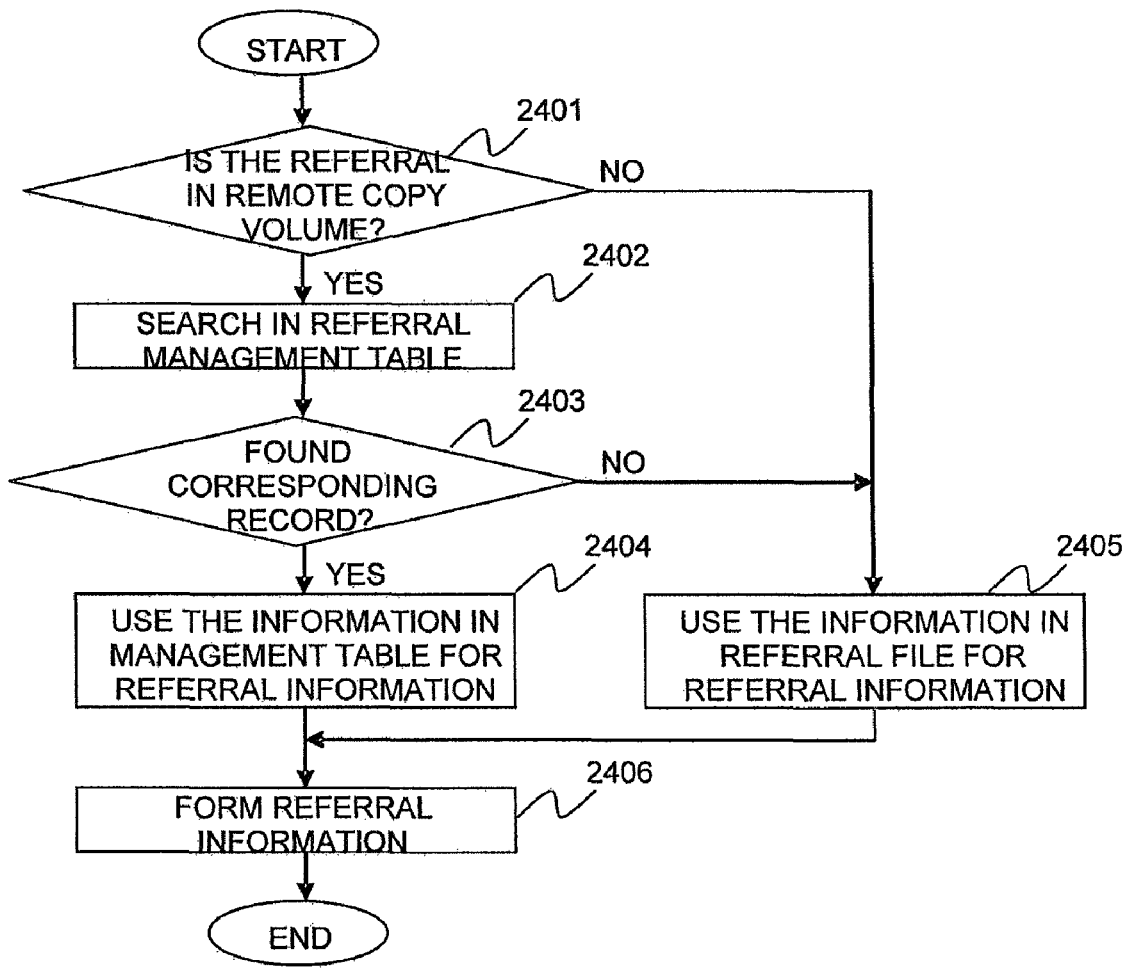
FIG. 31 illustrates exemplary formation of referral information.

FIG. 31 shows the flow diagram that the Remote Site NAS Systems form the new referral information when they receives access request to the referral files in the secondary volumes from clients.

Step 2401: The Remote Site NAS System checks if the referral file the client is trying to access is in a secondary volume or not.

Step 2402: If it's in a secondary volume, the Remote Site NAS System searches corresponding record in the Referral Management Table 2301 using the path and filename of the referral file as the key. If yes, it proceeds to step 2402. If no, it proceeds to step 2405.

Step 2403: A check is made if there is a corresponding record in the Referral Management Table 2301. If yes, it proceeds to step 2404. If no, it proceeds to step 2405.

Step 2404: If there is a corresponding record for the referral file, the Remote Site NAS System uses the information on the Referral Management Table 2301 to form the response to the client.

Step 2405: If the referral file the client is trying to access is not in a secondary volume, or if there is not a corresponding record for the referral file on the Referral Management Table 2301, the Remote Site NAS System uses the information in the referral file to form the response to the client.

Step 2406: the Remote Site NAS System returns the response to the client.

V. USE OF THE INVENTION

This invention is used for file servers or Network Attached Storage (NAS) systems having a function to act as NFS version 4 servers. As it would be appreciated by those of skill in the art, the inventive concept may be used in a wide variety of other storage systems having data replication functionality.

Figure 32:
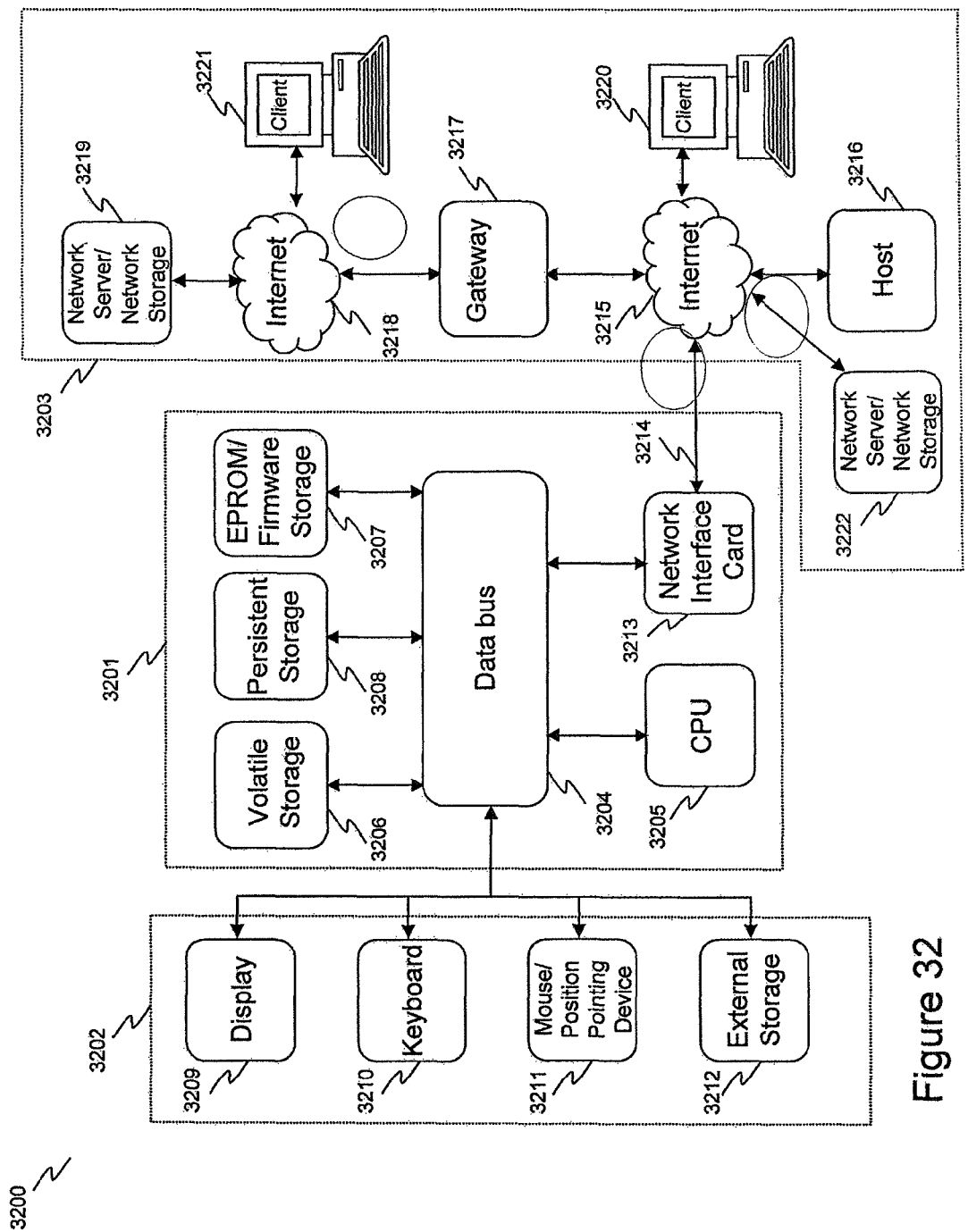
FIG. 32 illustrates an exemplary embodiment of a computer platform upon which the inventive system may be implemented.

FIG. 32 is a block diagram that illustrates an embodiment of a computer/server system 3200 upon which an embodiment of the inventive methodology may be implemented. The system 3200 includes a computer/server platform 3201, peripheral devices 3202 and network resources 3203.

The computer platform 3201 may include a data bus 3204 or other communication mechanism for communicating information across and among various parts of the computer platform 3201, and a processor 3205 coupled with bus 3201 for processing information and performing other computational and control tasks. Computer platform 3201 also includes a volatile storage 3206, such as a random access memory (RAM) or other dynamic storage device, coupled to bus 3204 for storing various information as well as instructions to be executed by processor 3205. The volatile storage 3206 also may be used for storing temporary variables or other intermediate information during execution of instructions by processor 3205. Computer platform 3201 may further include a read only memory (ROM or EPROM) 3207 or other static storage device coupled to bus 3204 for storing static information and instructions for processor 3205, such as basic input-output system (BIOS), as well as various system configuration parameters. A persistent storage device 3208, such as a magnetic disk, optical disk, or solid-state flash memory device is provided and coupled to bus 3201 for storing information and instructions.

Computer platform 3201 may be coupled via bus 3204 to a display 3209, such as a cathode ray tube (CRT), plasma display, or a liquid crystal display (LCD), for displaying information to a system administrator or user of the computer platform 3201. An input device 3210, including alphanumeric and other keys, is coupled to bus 3201 for communicating information and command selections to processor 3205. Another type of user input device is cursor control device 3211, such as a mouse, a trackball, or cursor direction keys for communicating direction information and command selections to processor 3204 and for controlling cursor movement on display 3209. This input device typically has two degrees of freedom in two axes, a first axis (e.g., x) and a second axis (e.g., y), that allows the device to specify positions in a plane.

An external storage device 3212 may be connected to the computer platform 3201 via bus 3204 to provide an extra or removable storage capacity for the computer platform 3201. In an embodiment of the computer system 3200, the external removable storage device 3212 may be used to facilitate exchange of data with other computer systems.

The invention is related to the use of computer system 3200 for implementing the techniques described herein. In an embodiment, the inventive system may reside on a machine such as computer platform 3201. According to one embodiment of the invention, the techniques described herein are performed by computer system 3200 in response to processor 3205 executing one or more sequences of one or more instructions contained in the volatile memory 3206. Such instructions may be read into volatile memory 3206 from another computer-readable medium, such as persistent storage device 3208. Execution of the sequences of instructions contained in the volatile memory 3206 causes processor 3205 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 3205 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 3208. Volatile media includes dynamic memory, such as volatile storage 3206. Transmission media includes coaxial cables, copper wire and fiber optics, including the wires that comprise data bus 3204. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 3205 for execution. For example, the instructions may initially be carried on a magnetic disk from a remote computer. Alternatively, a remote computer can load the instructions into its dynamic memory and send the instructions over a telephone line using a modem. A modem local to computer system 3200 can receive the data on the telephone line and use an infra-red transmitter to convert the data to an infra-red signal. An infra-red detector can receive the data carried in the infra-red signal and appropriate circuitry can place the data on the data bus 3204. The bus 3204 carries the data to the volatile storage 3206, from which processor 3205 retrieves and executes the instructions. The instructions received by the volatile memory 3206 may optionally be stored on persistent storage device 3208 either before or after execution by processor 3205. The instructions may also be downloaded into the computer platform 3201 via Internet using a variety of network data communication protocols well known in the art.

The computer platform 3201 also includes a communication interface, such as network interface card 3213 coupled to the data bus 3204. Communication interface 3213 provides a two-way data communication coupling to a network link 3214 that is connected to a local network 3215. For example, communication interface 3213 may be an integrated services digital network (ISDN) card or a modem to provide a data communication connection to a corresponding type of telephone line. As another example, communication interface 3213 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 3213 sends and receives electrical, electromagnetic or optical signals that carry digital data streams representing various types of information.

Network link 3213 typically provides data communication through one or more networks to other network resources. For example, network link 3214 may provide a connection through local network 3215 to a host computer 3216, or a network storage/server 3217. Additionally or alternatively, the network link 3213 may connect through gateway/firewall 3217 to the wide-area or global network 3218, such as an Internet. Thus, the computer platform 3201 can access network resources located anywhere on the Internet 3218, such as a remote network storage/server 3219. On the other hand, the computer platform 3201 may also be accessed by clients located anywhere on the local area network 3215 and/or the Internet 3218. The network clients 3220 and 3221 may themselves be implemented based on the computer platform similar to the platform 3201.

Local network 3215 and the Internet 3218 both use electrical, electromagnetic or optical signals that carry digital data streams. The signals through the various networks and the signals on network link 3214 and through communication interface 3213, which carry the digital data to and from computer platform 3201, are exemplary forms of carrier waves transporting the information.

Computer platform 3201 can send messages and receive data, including program code, through the variety of network(s) including Internet 3218 and LAN 3215, network link 3214 and communication interface 3213. In the Internet example, when the system 3201 acts as a network server, it might transmit a requested code or data for an application program running on client(s) 3220 and/or 3221 through Internet 3218, gateway/firewall 3217, local area network 3215 and communication interface 3213. Similarly, it may receive code from other network resources.

The received code may be executed by processor 3205 as it is received, and/or stored in persistent or volatile storage devices 3208 and 3206, respectively, or other non-volatile storage for later execution. In this manner, computer system 3201 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive, Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A storage system comprising:
a first storage system storing first data, wherein the first storage system is operable to replicate the first data to produce a first snapshot data;
a second storage system storing second data, wherein the second storage system is operable to replicate the second data to produce a second snapshot data; and
a management computer;
wherein the management computer sends a request to take a snapshot to the first storage system,
wherein the first storage system produces the first snapshot data by replicating the first data according to the request to take the snapshot,
wherein the second storage system produces the second snapshot data by replicating the second data;
wherein if the first data includes a first referral information pointing to the second data, a second referral information of the first snapshot data is changed from pointing to the second data to pointing to the second snapshot data;
wherein the first storage system sends a second request to take a snapshot to the second storage system if the first data includes the first referral information pointing to the second data;
wherein the second storage system produces the second snapshot data by replicating the second data according to the second request to take the snapshot;
wherein the first storage system checks, from searching referral information within data exported by the first storage system, whether the first data includes the first referral information pointing to the second data or not; wherein the second referral information of the first snapshot data is changed from pointing to the second data to pointing to the second snapshot data if the first referral information pointing to the second data was found in the data exported by the first storage system.

2. The storage system of claim 1, wherein the management computer manages a management information including referral information of the first data and the second data, and checks, from the management information, whether the first data includes a first referral information pointing to the second data or not.

3. The storage system of claim 2, wherein the management computer sends the request to take the snapshot with new referral information if the first data includes the first referral information pointing to the second data.

4. The storage system of claim 3, wherein the second referral information of the first snapshot data is changed from pointing to the second data to pointing to the second snapshot data based on the new referral information included in the request to take the snapshot.

5. A method of operating a storage system comprising a first storage system, a second storage system and a management computer, the method comprising:

sending, from the management computer, a request to take a snapshot to the first storage system;

producing, via the first storage system, a first snapshot data by replicating first data stored in the first storage system according to the request to take the snapshot; and producing, via the second storage system, a second snapshot data by replicating second data stored in the second storage system;

wherein if the first data includes a first referral information pointing to the second data, changing a second referral information of the first snapshot data from pointing to the second data to pointing to the second snapshot data;

wherein the first storage system sends a second request to take a snapshot to the second storage system if the first data includes a first referral information pointing to the second data;

wherein the second storage system produces the second snapshot data by replicating the second data according to the second request to take the snapshot;

wherein the first storage system checks, from searching referral information within data exported by the first storage system, whether the first data includes the first referral information pointing to the second data or not;

wherein the second referral information of the first snapshot data is changed from pointing to the second data to pointing to the second snapshot data if the first referral information pointing to the second data was found in the data exported by the first storage system.

6. The method of claim 5, wherein the management computer manages a management information including referral information of the first data and the second data, and checks, from the management information, whether the first data includes a first referral information pointing to the second data or not.

7. The method of claim 6, wherein the management computer sends the request to take the snapshot with new referral information if the first data includes the first referral information pointing to the second data.

8. The method of claim 7, wherein the second referral information of the first snapshot data is changed from pointing to the second data to pointing to the second snapshot data based on the new referral information included in the request to take the snapshot.

* * * * *